(12) United States Patent
Duffield et al.

(10) Patent No.: US 6,310,857 B1
(45) Date of Patent: Oct. 30, 2001

(54) METHOD AND APPARATUS FOR SMOOTHING AND MULTIPLEXING VIDEO DATA FLOWS

(75) Inventors: Nicholas G. Duffield, Hoboken; Kadangode K. Ramakrishnan, Berkeley Heights; Amy Ruth Reibman, Matawan, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/097,676

(22) Filed: Jun. 16, 1998

Related U.S. Application Data

(60) Provisional application No. 60/049,792, filed on Jun. 16, 1997, and provisional application No. 60/056,186, filed on Aug. 19, 1997.

(51) Int. Cl.$^7$ .................................................. H04L 12/26
(52) U.S. Cl. ......................................... 370/232; 370/253
(58) Field of Search ................................ 370/232, 253, 370/335, 465

(56) References Cited

U.S. PATENT DOCUMENTS

| | | | | |
|---|---|---|---|---|
| 5,546,377 | * | 8/1996 | Ozveren | 370/253 |
| 5,675,576 | * | 10/1997 | Kalampoukas et al. | 370/232 |
| 5,754,530 | * | 5/1998 | Awdeh et al. | 370/232 |
| 5,991,268 | * | 10/1999 | Awdeh et al. | 370/232 |
| 6,052,361 | * | 4/2000 | Ansari et al. | 370/232 |
| 6,219,343 | * | 4/2001 | Honkasalo et al. | 370/335 |

* cited by examiner

*Primary Examiner*—Salvatore Cangialosi
(74) *Attorney, Agent, or Firm*—Kenyon & Kenyon

(57) ABSTRACT

A method and apparatus provide a smoothing and rate adaptation algorithm to facilitate the flow of video data, maintaining video quality while avoiding potentially harmful buffering delays. The invention uses a smoothing interval to determine a rate to request for allocation. The invention also adapts the encoding rate in relation to a target delay for a source buffer.

28 Claims, 18 Drawing Sheets

FIG. 2

| SET | NAME | TYPE | LENGTH (frames) | CODING | RATE (fps) | MEAN RATE (bits/frame) | PEAK RATE (bits/frame) |
|---|---|---|---|---|---|---|---|
| A | Blues | ent | 40680 | MPEG2 | 24 | 54823 | 339304 |
| B | Star Wars | ent | 174138 | MPEG1 | 24 | 15593 | 185267 |
| C | Anwar | vtc | 9000 | H.261 | 30 | 10495 | 99250 |
|   | Dave | vtc | 9000 | H.261 | 30 | 28330 | 112549 |
|   | Ted | vtc | 9000 | H.261 | 30 | 10736 | 78464 |
|   | Pat | vtc | 9000 | H.261 | 30 | 11704 | 78004 |
|   | Yan | vtc | 7500 | H.261 | 30 | 7214 | 88141 |
| D | Partho-1 | vtc | 45000 | H.261 | 25 | 66202 | 322048 |
|   | Partho-2 | vtc | 38137 | H.261 | 25 | 168720 | 539616 |
| E | mrbean | ent | 40000 | MPEG1 | 24 | 17647 | 229072 |
|   | asterix | ent | 40000 | MPEG1 | 24 | 22349 | 147376 |
|   | atp | ent | 40000 | MPEG1 | 24 | 21890 | 190856 |
|   | bond | ent | 40000 | MPEG1 | 24 | 24308 | 244592 |
|   | dino | ent | 40000 | MPEG1 | 24 | 13078 | 119632 |
|   | fuss | ent | 40000 | MPEG1 | 24 | 27129 | 187176 |
|   | lambs | ent | 40000 | MPEG1 | 24 | 7312 | 134224 |
|   | movie2 | ent | 40000 | MPEG1 | 24 | 14288 | 172672 |
|   | mtv | ent | 40000 | MPEG1 | 24 | 24604 | 229200 |
|   | mtv2 | ent | 40000 | MPEG1 | 24 | 19780 | 251408 |
|   | news2 | ent | 40000 | MPEG1 | 24 | 15358 | 189888 |
|   | race | ent | 40000 | MPEG1 | 24 | 30749 | 202416 |
|   | sbowl | ent | 40000 | MPEG1 | 24 | 23506 | 140840 |
|   | simpsons | ent | 40000 | MPEG1 | 24 | 18576 | 240376 |
|   | soccerwm | ent | 40000 | MPEG1 | 24 | 25110 | 190296 |
|   | star2 | ent | 40000 | MPEG1 | 24 | 9313 | 124816 |
|   | talk2 | ent | 40000 | MPEG1 | 24 | 17915 | 132752 |
|   | talk | ent | 40000 | MPEG1 | 24 | 14537 | 106768 |
|   | term | ent | 40000 | MPEG1 | 24 | 10905 | 79560 |

| PERCENTILES | IDEAL RATE | ENCODED RATE | REQUESTED RATE | SOURCE DELAY |
|---|---|---|---|---|
| 50.0 | 48888.00 | 48888.00 | 98675.00 | 21.0 |
| 90.0 | 86496.00 | 86393.60 | 134534.00 | 42.0 |
| 95.0 | 100616.80 | 100216.80 | 143564.05 | 49.0 |
| 99.0 | 140059.76 | 138501.48 | 164653.00 | 72.0 |
| 99.5 | 171801.20 | 170317.44 | 164653.00 | 79.0 |
| 99.9 | 236743.51 | 231572.49 | 164653.00 | 88.0 |
| 99.95 | 247337.04 | 244964.27 | 164653.00 | 89.66 |
| 99.99 | 290190.42 | 286291.59 | 164653.00 | 90.0 |
| 100.0 | 339304.00 | 339304.00 | 164653.00 | 90.0 |
| MEAN | 54823.41 | 54755.78 | 100983.68 | 24.45 |

| PERCENTILES | IDEAL RATE | ENCODED RATE | REQUESTED RATE | SOURCE DELAY |
|---|---|---|---|---|
| 50.0 | 8069.0 | 8069.0 | 43638.0 | 9.0 |
| 90.0 | 40369.5 | 40364.5 | 55661.0 | 42.0 |
| 95.0 | 58637.0 | 58619.0 | 62192.0 | 57.0 |
| 99.0 | 84380.7 | 84243.4 | 84906.0 | 80.0 |
| 99.5 | 92758.3 | 92388.5 | 89898.0 | 84.0 |
| 99.9 | 111790.1 | 111457.2 | 89898.0 | 87.0 |
| 99.95 | 127631.1 | 127060.5 | 89898.0 | 87.0 |
| 99.99 | 161954.7 | 159132.9 | 89898.0 | 88.0 |
| 100.0 | 185267.0 | 185267.0 | 89898.0 | 93.0 |
| MEAN | 15598.2 | 15591.8 | 44809.7 | 16.5 |

| FEEDBACK DELAY | REDUCTION | | | MEAN # SUCCESS | MEAN # FAILURE |
| --- | --- | --- | --- | --- | --- |
| | ≥ 0% | ≥ 20% | ≥ 50% | | |
| 1 FRAME | 0.0032 | 0.0011 | 0 | 2256.7 | 3.28 |
| 2 FRAMES | 0.0036 | 0.0012 | 0 | 2030.7 | 3.25 |
| 3 FRAMES | 0.0037 | 0.0014 | 0 | 2030.1 | 3.85 |
| 4 FRAMES | 0.0042 | 0.0016 | 0 | 1933.1 | 4.00 |

| TRACE | MEAN RATE | | | PROP. REDUCED ≥ 20% |
|---|---|---|---|---|
| | IDEAL | ENCODED | REQUESTED | |
| ANWAR | 10495 | 10483 | 15615 | 0.000889 |
| DAVE | 28330 | 28297 | 33223 | 0.001667 |
| PAT | 11704 | 11689 | 16561 | 0.000778 |
| TED | 10736 | 10723 | 15159 | 0.000222 |
| YAN | 7214 | 7202 | 15303 | 0.001067 |
| PARTHO-1 | 66202 | 66196 | 95891 | 0.000067 |
| PARTHO-2 | 168720 | 168693 | 195624 | 0.000210 |
| BLUES | 54823 | 54755 | 100983 | 0.001057 |
| STAR WARS | 15598 | 15591 | 44809 | 8.613957e-05 |

FIG. 12

| $w_{MAX}$ | REQUEST MEAN | CROPPING LEVEL | | | DELAY | |
|---|---|---|---|---|---|---|
| | | 0% | 20% | 50% | MEAN | MAX. |
| 1000 | 93089 | 0.0025 | 0.0008 | 0 | 26 | 65 |
| 100 | 72954 | 0.0126 | 0.0060 | 0 | 33 | 68 |
| 10 | 59526 | 0.0256 | 0.0166 | 0 | 39 | 71 |
| 1 | 57548 | 0.0267 | 0.0176 | 0 | 31 | 72 |

FIG. 13

| $w_{MAX}$ | REQUEST MEAN | CROPPING LEVEL | | | DELAY | |
|---|---|---|---|---|---|---|
| | | 0% | 20% | 50% | MEAN | MAX. |
| 1000 | 32300 | 0.0030 | 0.0016 | 0.0001 | 30 | 65 |
| 100 | 30347 | 0.0076 | 0.0036 | 0.0004 | 33 | 65 |
| 10 | 29869 | 0.0103 | 0.0051 | 0.0008 | 33 | 65 |
| 1 | 29731 | 0.0122 | 0.0062 | 0.0012 | 34 | 65 |

| TARGET DELAY (ms) | CROPPING ≥0% | CROPPING ≥20% | MEAN DELAY (ms) |
|---|---|---|---|
| 50 | 0.0012 | 0.00017 | 13.9 |
| 60 | 0.0014 | 0.00022 | 16.7 |
| 70 | 0.0017 | 0.00034 | 19.3 |
| 80 | 0.0023 | 0.00071 | 21.9 |
| 90 | 0.0032 | 0.00106 | 24.5 |
| 100 | 0.0041 | 0.00120 | 27.1 |
| 110 | 0.0048 | 0.00145 | 29.8 |
| 120 | 0.0054 | 0.00182 | 32.4 |

| OVER-REQUEST $\beta$ | CROPPING | | MEAN DELAY (ms) |
|---|---|---|---|
| | >0% | >20% | |
| 0.9 | 0.0886 | 0.0212 | 34.2 |
| 1.0 | 0.0082 | 0.0018 | 27.8 |
| 1.05 | 0.0032 | 0.0011 | 24.5 |
| 1.10 | 0.0022 | 0.0007 | 23.0 |
| 1.20 | 0.0007 | 0.0002 | 20.8 |
| 1.30 | 0.0003 | 0.0001 | 19.1 |

FIG. 29

| %ILE | ALIGNMENT | AGGREGATE FRAME SIZE (BITS) | MULTIPLE OF MEAN | MEAN FRAMES BELOW | MEAN FRAMES ABOVE | MAX. FRAMES ABOVE | MAX. REDUCTION (IF ABOVE) | MEAN REDUCTION (IF ABOVE) |
|---|---|---|---|---|---|---|---|---|
| 75% | ALIGNED | 613518 | 1.04 | 141 | 65.2 | 856 | 21.5% | 4.1% |
|  | RANDOM | 616511 | 1.04 | 165 | 63.2 | 443 | 19.4% | 4.0% |
| 90% | ALIGNED | 640145 | 1.08 | 262 | 41.5 | 383 | 18.0% | 3.5% |
|  | RANDOM | 643053 | 1.09 | 296 | 37.5 | 170 | 16.0% | 3.2% |
| 99% | ALIGNED | 695096 | 1.18 | 1357 | 22.5 | 34 | 11.1% | 2.6% |
|  | RANDOM | 690728 | 1.17 | 1235 | 15.3 | 31 | 9.7% | 2.3% |
| 99.9% | ALIGNED | 738400 | 1.25 | 5704 | 10.3 | 16 | 5.5% | 2.0% |
|  | RANDOM | 728083 | 1.23 | 7990 | 9.6 | 14 | 4.8% | 2.2% |
| 100% | ALIGNED | 781499 | 1.32 | ALL | 0 | 0 | 0 | 0 |
|  | RANDOM | 765109 | 1.29 | ALL | 0 | 0 | 0 | 0 |

FIG. 31

| %ILE | AGGREGATE FRAME SIZE (BITS) | MULTIPLE OF MEAN | MEAN FRAMES BELOW | MEAN FRAMES ABOVE | MAX. FRAMES ABOVE | MAX. REDUCTION (IF ABOVE) | MEAN REDUCTION (IF ABOVE) |
|---|---|---|---|---|---|---|---|
| 75% | 1038378 | 1.03 | 130 | 42.1 | 310 | 3.3% | 1.0% |
| 90% | 1051190 | 1.05 | 144 | 16.2 | 57 | 2.1% | 0.6% |
| 99% | 1063088 | 1.05 | 565 | 6 | 24 | 1.0% | 0.4% |
| 100% | 1073571 | 1.07 | ALL | 0 | 0 | 0 | 0 |

METHOD AND APPARATUS FOR SMOOTHING AND MULTIPLEXING VIDEO DATA FLOWS

CROSS REFERENCE TO RELATED APPLICATIONS

The present application claims the benefit of priority to application No. 60/049,792, entitled "ADAPTING COMPRESSED VIDEO; MECHANISMS FOR SMOOTHING AND MULTIPLEXING", filed on Jun. 16, 1997 and application No. 60/056,186, entitled "SAVE: AN ALGORITHM FOR SMOOTHED ADAPTIVE VIDEO OVER EXPLICIT RATE NETWORKS", filed on Aug. 19, 1997. The entirety of the disclosures of these two applications are hereby incorporated by reference.

BACKGROUND OF THE INVENTION

The present invention is related to method and apparatus for improving flows of video data. More particularly the present invention is directed to method and apparatus for smoothing data at a source and coordinating a data rate allocation provided by a transport medium such as a data network.

Video traffic is an increasingly important component of the workload of computer networks. Because video is so data intensive it is commonplace to use compression techniques to reduce the volume of data that must be transferred in a transmission of video. The desired quality of the video to be delivered to a receiver varies widely, depending on the application, the potential cost to a user, and the network infrastructure that is available for transporting the video. As a result, there is a relatively large class of applications that can tolerate some variability in the perceived quality of the video, including video teleconferencing, interactive training, low-cost information distribution such as news, and even some entertainment video. Especially for this class of applications, the compressed video sources may be rate adaptive, that is, by adjusting the video encoding parameters so as to be responsive to the conditions in the network it is possible to dynamically modify the source rate. One parameter particularly suitable to the task of rate adaptation is the quantization parameter.

Transporting video over Asynchronous Transfer Mode (ATM) networks has been an active area of research. The methods proposed for transport of compressed video span the spectrum of services offered by ATM networks: Constant Bit Rate (CBR), Variable Bit Rate (VBR), Available Bit Rate (ABR) and Unspecified Bit Rate (UBR). The very nature of video data has an impact on the effectiveness of any one of these ATM services. For example, compressed video is inherently bursty with data rate fluctuations happening over multiple time scales due to the fluctuations in the amount of data necessary to adequately represent the compressed frame (s) of video data. Since a compressed video source is bursty, the use of constant bit rate (CBR) transport requires the use of a local buffer for smoothing. The advantage of CBR transport is that it makes admission control simple. However, there is no attempt to exploit any multiplexing gains possible with the original bursty traffic sources. In unrestricted (or open-loop) VBR transport, the inherently bursty traffic from the coder is transported over the real-time VBR service class, thereby potentially providing greater multiplexing gain than with CBR.

Among the promising approaches for adapting to the short-term fluctuations in the rate required for video are Renegotiated CBR (RCBR), and feedback-based congestion control. U.S. patent application Ser. No. 08/825,988, entitled "A Method and Apparatus for Supporting Compressed Video with Explicit Rate Congestion Control" and filed on Apr. 4, 1997, (assigned to the assignee of the present invention) attempts to achieve the goals of increasing the multiplexing gain through frequent negotiation for bandwidth between the source and the network. The approach attempts to be responsive to the needs of the video data source, while at the same time relying on the adaptation of source rates to match bandwidth available in the network. The scheme uses congestion control mechanisms described for ATM's ABR service, referred to as explicit rate-based congestion control (examples of which are described in "ATM Forum Traffic Management Specification Version 4.0, Draft Specification ATM Forum/95-0013R11, ATM Forum March 1996 and "A Efficient Rate Allocation Algorithm for ATM Networks Providing Max-Min Fairness", Kalampoukas, et al., Proceedings of 6th IFIP International Conf. on High Performance Networking, HPN '95, Spain Sep. 11–15, 1995). This congestion control mechanism provides rate negotiation while maintaining low queuing delays in the network.

In application number '988, the response of the video source to insufficient bandwidth available from the network was to reduce the source rate by modifying the quantization value. The explicit mechanism to limit the degradation in the quality of the video below a minimum was based on a minimum cell rate (MCR) being guaranteed for the connection at the time it was setup. The admission control was relatively simple, based on the sum of the MCR values for all connections being available. The mechanisms did not make any further attempts to manage the quality degradation. It is believed that there is varying tolerance to alteration in the quality, depending on the video content (e.g., a teleconference video may be able to tolerate a grater quality degradation than entertainment video) and the scheme suggested in application '988 may be applicable in many situations. Nevertheless, it is believed that there are many circumstances in which the reduction in the source quality that is imposed by altering the quantization parameter in response to the feedback received from the network is either less tolerable or intolerable. It would be beneficial if there existed techniques that could be implemented at the source that would aid in significantly reducing this degradation of quality.

It would also be beneficial to provide a mechanism at the source which facilitates multiplexing of sources along the network links.

Multiplexing gain may be achieved as a result of overlapping "peaks" and "valleys" of the different sources of video on a link at a given time. The aggregate flows tend to be less bursty than the individual flows. The larger the number of simultaneously active flows, the higher the potential for multiplexing gain.

If an individual source is less bursty, then it is easier to support that flow by allocating a lower rate to the flow. As indicated above, compressed video is bursty over multiple time scales: at the individual frame level, possibly due to the compression algorithm and its periodic nature; at the scene level, due to changing activity and detail within a given scene; and finally between scenes, due to the different scene contents. It would be beneficial then to achieve a multiplexing gain using the explicit rate mechanisms both at the scene-level and the between-scene time scales. Algorithms that smooth the traffic from an individual video source might make it more predictable over a short time. Smoother traffic could allow source rate allocation to be made more accurately and easily over this short time scale.

There has been considerable work examining the effectiveness of smoothing of stored video. Examples include, "A Scheme for Smoothing Delay Sensitive Traffic Offered to ATM Networks", Ott et al., Proceedings of IEEE Infocom 1992, pp. 776–785, May 1992, and "Supporting Stored Video: Reducing Rate Variability Smoothing", Salehi, et al., Proceedings of the ACM Sigmetrics Conference on Measurement and Modeling of Computer Systems, pp. 222–231, May 1996. These require knowledge of the sequence of frame rates over a reasonably long window, to find the smoothing function that minimizes the overflow and underflow probability of the buffer at the source, while determining the longest piece-wise constant rate to present to the network.

SUMMARY OF THE INVENTION

The present invention provides a method and apparatus that improve data flows that are otherwise bursty in nature. The present invention seeks to smooth out the bursty nature of the encoded video data. In accordance with an embodiment of the present invention the encoding rate of the source is monitored over a smoothing interval. The transmission rate of the source is then affected by this frame encoding rate information. This has the result of smoothing the bursts of higher data rates over a time interval that the network can better digest.

In accordance with an application of the present invention to the explicit rate environment the source requests an allocated rate using as a reference a smoothing interval over which frame rate information is monitored. Thus the rate request does not always follow directly the instantaneous frame rate of the encoder. This is beneficial where the frame rate may vary significantly, such as based on the coding technique employed, e.g., MPEG, and/or on the changes that may occur at the scene level in a video data context. Furthermore, in accordance with the invention, the encoding rate is varied, such as for example by varying a quantization parameter, based on a target delay. This contrasts with prior techniques in which the encoding rate is varied based on the rate allocated by the network.

In one embodiment of this application of the present invention the smoothing interval is varied in response to a detected source buffer delay. As the smoothing interval is varied this has an impact on the requested rate.

In a second embodiment of this application of the present invention the rate is requested with reference to two windows, a first smaller smoothing interval which is at least as long as a period of the encoded data, and a second larger, or maximum window. The window sizes are fixed and the rate request is made with reference to encoding rates detected over both intervals.

These two embodiments improve the flow of bursty data using smoothing intervals over which rate allocations are requested to enhance a network's ability to multiplex a number of such flows.

In addition to the explicit rate environment, the present invention has applicability to best-effort networks such as the Internet in which a source selects a transmission rate rather than request a rate allocation from the network. The selected transmission rate can be modified in response to packet loss information provided by the receiver. In this best efforts environment a smoothing interval can be used to select the transmission rate. As a result the transmission rates will no longer be closely tied to the instantaneous encoding rate and it is believed that this will enhance the network's ability to multiplex multiple bursty sources because the rate of transmission is smoother.

BRIEF DESCRIPTION OF THE DRAWINGS

FIGS. 2 to 31 include tables and graphs used for explaining the efficacy of the present invention as detected in a series of simulations.

DETAILED DESCRIPTION

A. Overview

1. Explicit-Rate Environment

Figure 1:
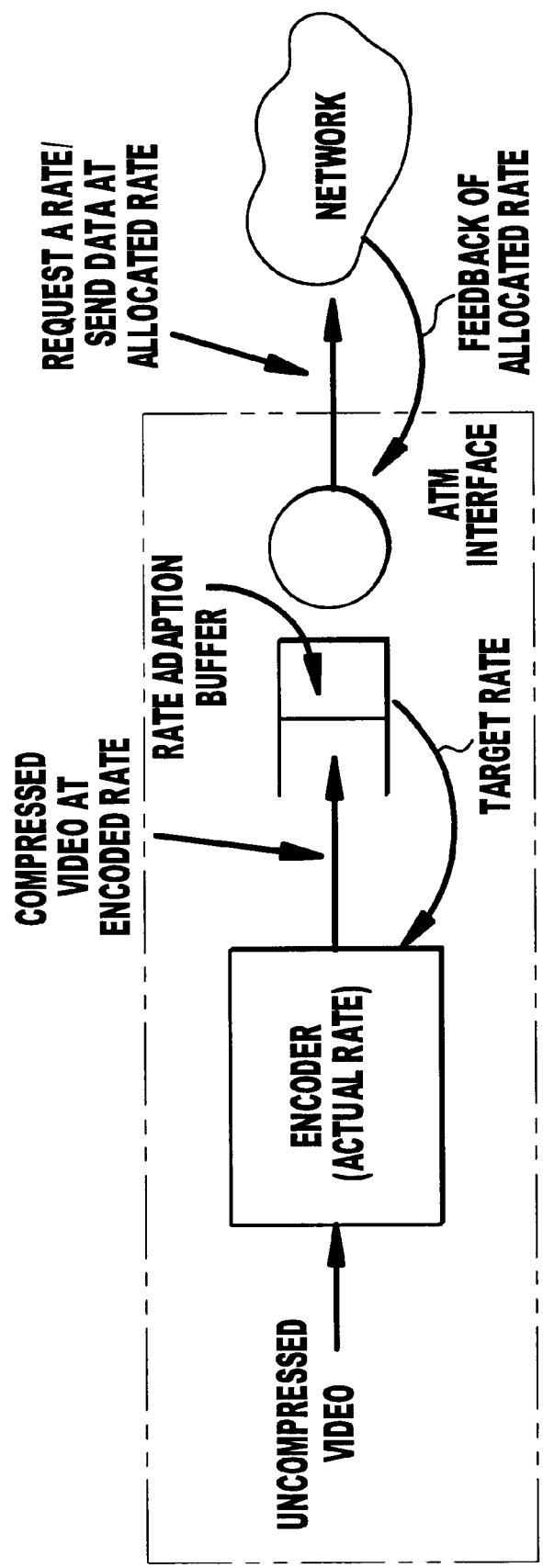
FIG. 1 shows a block diagram of a system in which an embodiment of the present invention can be employed.

FIG. 1 shows the framework in which the effectiveness of adapting compressed video sources in a rate-controlled network is examined. In this configuration a video source 101 is connected to a network 110, in this example an ATM network that employs an Available Bit Rate (ABR) service. The source 101 includes: a content source 120 that produces a stream of uncompressed video 125; an encoder 130 that encodes the uncompressed video at an adaptable rate and which has some nominal ideal coding rate; a rate adaptation buffer 140 coupled to the encoder and storing the compressed video received at the encoded rate; and an ATM interface 150 coupled between the buffer 140 and network 110. The ATM interface requests a data rate from the network, receives an allocated rate and then sends data at the allocated rate. It should be noted that the source could be an original source at a terminus of the network or could be a virtual source embedded within the network. The encoder 130 is capable of encoding a frame such that the maximum size of the compressed output frame does not exceed a given size. This framework is applicable to coding schemes such as JPEG and MPEG.

The rate-adaptation buffer is a source buffer that is used to accommodate the variability in the demand from the encoder. It also accommodates the difference between the rate coming into the buffer and the output rate of the source into the network. The output rate of the source is controlled by the explicit-rate congestion control algorithm which specifies the rate at which the source may transmit data into the network. The source is allowed to request a rate from the network, and the network responds with an allocated rate based on the contention for resources in the network. The network provides the assurance that the rate allocated to the source will not go below a minimum rate that is negotiated at the time of setting up the connection. Furthermore, the minimum rate that the source requests may be selected so that the quality for the video does not go below a minimum acceptable level. Applicable source and switch policies for an explicit rate mechanism are described in application number '988 and those descriptions are hereby incorporated by reference. The following defines the different rates for this environment:

Ideal Rate: This is the rate that is required by the encoder to code the frame at ideal quality.

Encoded Rate: This relates to the rate that is given to the encoder as a target rate that is based on an algorithm for smoothing and rate-adaptation. It is assumed that the encoder will precisely meet the rate it is given as the target for a frame, as long as the encoded rate is less than the ideal rate for the frame. The difference between the ideal rate and the encoded rate is the result of adapting the coder when buffering alone is insufficient to achieve a balance between the allocated rate and the ideal rate.

Requested Rate: This is the rate that the source requests from the network based on the smoothing algorithm, the state of the source buffer, and the ideal rate for the frame.

Allocated Rate: This is the rate returned from the network, after a feedback delay, in response to the source's requested rate. An initial evaluation of our algorithms assumes that the allocated rate returned is the requested rate after a feedback delay. The evaluation will also examine the impacts of receiving an allocation less than that requested.

It is helpful for understanding the relationship between the source and the network to understand the implications of using the ABR service. The ABR service is being defined in the ATM Forum to support applications that require best-effort service. Although no assurances are made of maintaining low delay or jitter, the feedback control algorithm employed in this service attempts to maintain small queues at the routers and feasible transmission rates for the individual sources (i.e., the aggregate transmission rate of all the currently active sources utilizing a link does not exceed the link capacity). To a great extent, best-effort applications desire a low loss rate. Although no quantitive requirements have been specified for the ABR service, small cell loss rates are likely. With the use of explicit-rate mechanisms and appropriate switch rate-allocation algorithms, it is believed that not only will the cell loss rates be smaller, but also the queuing delays will be quite small.

In the explicit-rate ABR schemes, in-band Resource Management (RM) cells are periodically (in terms of cells sent by the source) transmitted by each source. A source specifies a "demand" or desired transmit rate in each transmitted RM cell (in addition to the currently allowed rate), in an ER-field. Each switch in the path computes the rate they may allocate to each virtual circuit (VC), and overwrites this allocated rate in the ER-field if the computed rate is lower than what was in the received RM cell. As the RM cell progresses from the source to destination, the ER-field value reflects the minimum rate allocated by any of the switches in the path for the VC. On reaching its destination, the RM cell is returned to the source, which now sets its transmit rate based on the ER-field value in the returned RM cell.

One of the goals is to ensure that the video has a minimum assured quality. Another advantage of the ABR service, unlike traditional best-effort services in data networks such as the current TCP/IP Internet, is the guarantee of a minimum bandwidth. This can ensure acceptable quality even in periods of congestion. It is envisioned that a minimum rate would have to be based on experience gained from experiments with a specific class of video, and possibly on statistical source models. Admission control for ABR is based on a minimum cell rate negotiated on connection setup.

It is possible to keep the queuing delays seen by connections using the ABR service fairly small, since the explicit-rate schemes can ensure that the aggregate rate of all sources sharing a link remains below the link bandwidth. Individual ABR sources are required to maintain the rate at which cells are transmitted to be no more than the currently allowed transmission rate. The advantage of the mechanism is that the rate can potentially change sufficiently frequently to adapt to changing conditions in the network, and also to the demands of the source. To ensure that the delays experienced by video flows are reasonably small, it may be appropriate to separate those flows that are admission controlled and require low delay (e.g., video) from others that may not be admission controlled (e.g., bursty data). Concomitant with it may be a service discipline at the switches to serve the separate classes in proportion to the rates allocated to each of the classes.

The present invention provides techniques by which the source buffer, in conjunction with the ATM interface, can be effectively used to smooth the encoded video rate so as to minimize the need to adjust the coding rate itself. By effectively smoothing the encoded video rate the present invention enhances video quality and the network's ability to network bursty sources.

The present invention takes into account the fact that the source buffer delay may be significant enough to dominate the propagation delays in the total end-to-end frame delay absent some strict bound on the amount of delay contributed by the source. Understanding the delay contributed by the source and attempting to limit it, with high probability, to a reasonable value is desirable. This avoids the frame arriving late at the receiver and hence being lost. The present invention seeks to keep the delay in the source buffer bounded, by ensuring that the encoded frame does not exceed a maximum size.

Furthermore, the present invention attempts to compensate for the fact that the distributed explicit rate allocation algorithm should converge to the eventual max-min fair allocations for the individual flows and that, simplistically, the time it takes to converge to the max-min fair allocations for all the flows is approximately twice the round-trip time multiplied by the number of bottleneck rates as described in "Time Scale Analysis and Scalability Issues for Explicit Rate Allocation in ATM Networks" Charny et al., IEEE/ACM Transactions on Networking, Vol. 4, No. 4, August 1996. This convergence time is based on having the demand from the individual sources stable during the period of convergence of the distributed algorithm. Therefore, it is desirable to maintain the demand from the individual sources relatively constant during the period of convergence. The smoothing algorithms of the present invention attempt to keep the variability in the demand relatively small, so that the demands are not wildly oscillating, thus, helping the allocation process achieve fairness across the various sources. Although it is unlikely that the demand will be constant over the several round-trip times that may be required for achieving strict max-min fairness, it is believed that smoothing the demand will be helpful in achieving better "average" fairness compared to when the source rates change on a much shorter time-scale.

The present invention therefore employs a dynamic smoothing technique by which the source can effectively request and utilize an allocated rate to minimize the need to change quantization parameters. It is beneficial to use as long a smoothing as possible to get the benefit of: a) multiplexing a larger number of smooth video streams; and b) keeping a smooth rate request for the network so that it allows the ABR rate allocation mechanism to stabilize.

Smoothing relates to the notion of looking at activity over a time interval, such as a number of frames, to make a determination with regard to requesting a rate rather than looking at the instantaneous encoding rate as the dominant factor in selecting the request rate. This can be significant as the encoding rate will likely vary greatly as between certain of the frames (e.g., during a scene change), but may remain steady at other points in the frame sequence. Smoothing captures the bursty nature of the data and reduces its impact on the rate request process or at least spreads out that impact.

In accordance with an aspect of the invention, an interval for smoothing data rates is selected in accordance with conditions of the source buffer. One important concern is to not exceed a reasonable delay target for the amount of queuing at the source buffer. Excessive delays in the buffer will result in a lower budget for delays contributed by the network.

A number of factors are to be considered in selecting a smoothing interval. It is assumed that at start up the rate allocated to the flow is relatively small before the network can process the first request for a particular rate. Thus, a minimum smoothing interval is related to the periodicity of the compressed video. For example, in a compression algorithm such as MPEG there may be relatively large frames, that are intra-frame coded, that occur periodically. These will be interspersed with inter-frame coded frames that may be smaller; these smaller frames are used to reflect motion and changes from the previous larger frame. With MPEG-2 these large frames are the I-frames. The number of frames in a period is termed a Group of Pictures (GOP). A GOP typically consists of one I-frame followed by a series of other (not-I) frames, although this need not be the case. If the smoothing interval is selected to be substantially smaller than the periodicity of the source traffic the resulting performance can suffer.

Beyond periodicity of the video source, another issue having an impact on the selection of a minimum smoothing interval is the feedback delay in the network. This feedback delay concerns the time it takes for an RM cell that includes a requested rate to propagate through the network to its destination and for an allocation rate to be reported back to the source. In accordance with the invention it has been determined that it is appropriate to have a minimum smoothing interval that is comparable to this feedback delay.

Thus, in general terms, the present invention provides for smoothing the video source rate in accordance with specifically selected smoothing intervals and computations so as to reduce the need for adjusting the coding rate. The coding rate is varied only in accordance with respect to an upper bound being placed on the delay time to be introduced by the source buffer. Two specific algorithms for performing this dynamic smoothing will be described in the sections that follow.

What these algorithms have in common is the notion that the requested rates will be selected with reference to an ideal rate of the encoder over some period of time, a smoothing interval of some selected number of frames. The respective algorithms describe different techniques for correlating the smoothing interval to the requested rate.

The requested rate should be the typical rate, over some window of time, required to transmit the video without unacceptable delay. Clearly this rate must be at least as large as the average ideal rate of the video over the window of time; otherwise the source buffer will overflow. But it is generally not sufficient to have the requested rate merely equal to the average ideal rate, because fluctuations of the ideal rate at a smaller timescale than the averaging window could lead to large frames suffering unacceptable buffer delay. Thus, the aim of any rate request algorithm in the explicit rate network must be to adaptively select the requested rate to be large enough so that either (a) the buffer delay is acceptable; or (b) when frames require cropping in order to meet its delay constraint, the amount, frequency and duration of cropping does not degrade perceived quality unacceptably.

A first algorithm (described below) circumvents the occurrence of fluctuations at shorter timescales that the smoothing window. It accomplishes this by adaptively reducing the size of the smoothing window when buffer delays cross a threshold L1 somewhat below the boundary $\tau_{max}$ of acceptable delay. The window is enlarged again when buffer delays down-cross a level L2<L1.

A second algorithm (also described below) takes account of fluctuations in the ideal rate by a different mechanism. It keeps track of the typical maximum ideal frame size $f_{max}$ over some window of frame $\omega_{max} > \omega_{sm}$, where $\omega_{sm}$ is the smoothing window. Let $f_{sm}$ be the typical frame size over a window of size $\omega_{sm}$. The requested rate is then Rreq=max fmax/$\tau_{max}$, $f_{sm}/\tau$ where $\tau$ is the interframe time.

Both algorithms also modify the encoding rate in relationship to a source delay target calculated on the basis of a rate allocated by the network and the buffer fill amount and the encoding rate. The rate requested is adjusted using the smoothing interval and as a consequence the number of times in which the encoding will be reduced will be lowered.

As mentioned above the invention has been evaluated in those scenarios where the network allocated rate corresponds to the requested rate and where the network allocated rate is less than the requested rate. As would be expected, performance is better in the former scenario. Making the allocation of a requested data rate highly likely is achieved through the operation of admission control policy.

The statistical variability of the smoothed demand, and hence the requested rate, over time-scales longer than the settling down period will determine the multiplexing gains which are available across sources. The quality experienced by an individual source is degraded if a requested rate is not completely allocated, or if the rate allocation mechanisms allots a reduced rate at some time between requests. In either case, the mechanisms of the previous section will adjust the smoothing interval and/or source quantization level appropriately.

It is proposed that admission control should be done on the basis of an effective bandwidth appropriate for the quality offered in the channel. The precise form of the quality measures does not concern us at this stage. It is only required that the corresponding effective bandwidth can be determined by online measurements, or off-line in advance for generic traffic types. (See S. Crosby, et al., Near-Optimal CAC for ATM Networks based on online measurement, Preprint 1997; and S. Jamin et al., "A Measurement-based Admission Control Algorithm for Integrated Services Packet Networks"; Transactions on Networking, 1997 for some recent approaches to measurement based admission control.

The admission control procedure is the following: each flow attempting to obtain service will declare an effective bandwidth "b". This will be either as an explicit rate, or as a type (say video teleconference, interactive video game, or playback video) from which "b" is implicit. The flow will then be admitted if B+fb<C where "C" is the capacity of the channel, "f>1" is a safety factor, and "B" is the effective bandwidth of the currently admitted sources. "B" could be as simple as a sum of declared effective bandwidths of the currently admitted sources, or it could be derived from measurements of currently admitted flows. If the latter then there is some transient period over which "B" is replaced by the measured effective bandwidth of the new aggregate. This safety factor can be varied depending on the level of quality desired. It has been found that a rule of thumb for a particular good level of quality, where fewer than 0.1% of the frames are cropped more than 20%, would be two times the requested rate.

This admission control policy would be more optimal if it recognized and used measured requested rates where possible. For example, it is envisioned that there may be admission control schemes, possibly based on measurement, in which a new flow is admitted to the channel of capacity K if $$R_{current} + R_{new} \leq K$$

where $R_{current}$ is an estimate of the aggregate bandwidth requirement of currently admitted flows, and $R_{new}$ that of the new flow.

However, there is a problem for measurement based admission control. It is required to estimate $R_{current}$ from the history of the requested rate of admitted connections. If the new connection is able to declare a rate, it will either be implicit through a type (entertainment video, teleconference, etc.) of if explicit then more likely a characterization of its ideal rate than its requested rate. It is believed that twice the mean ideal rate of the new connection would serve as an estimate of $R_{new}$.

An estimate of $R_{current}$ would be the peak of the average rate over multiple intervals. For some parameters n, t>0, the estimate is $\max_{i=0}^{n-1} R_i$ where $R_i$ is the average requested rate over intervals $(-(i+1)t,-it)$. The notion is that over some interval the network will grant multiple allocations. It will improve the admission policy if the network takes into account these multiple allocations when decoding to accept another source.

When admitting a new source the network can rely on the ideal rate for the new source and apply the appropriate safety factor and compare it to the rates for other sources measured over the selected time interval.

If admission control is to be achieved without any measurement, then the only recourse is to the rule of thumb (i.e., each source required twice its mean rate) applied to declared mean ideal rates, i.e., we admit a new flow if $2\Sigma_i \bar{r}_i \leq K$ where the index i runs over the new and existing flows, and $\bar{r}_i$ is the declared mean rate of flow i.

Employing this admission control policy in the network would be advantageous in the implementation of the present invention.

The remainder of this application will now describe the details of two possible algorithms for implementing the present invention and that description will be followed by a description of an evaluation of the effectiveness of one of these algorithms and how well they achieve the desired multiplexing of data sources which are bursty.

2. Best Efforts Environment

In a best efforts environment a system could be configured very similarly to that of FIG. 1 with the following exceptions. The network would not explicitly allocate a rate to the source and would instead attempt to deliver, on a best efforts basis, whatever the source transmits. Thus, the network interface for the source would not generate a rate allocation request and would not receive a rate allocation.

In this environment the source would still encode data and store the encoded data in a source buffer. The source would then select a transmission rate for outputting the encoded data, thereby draining the source buffer. The smoothing interval concept described above can be applied to the process of selecting a transmission rate. More specifically, a transmission rate selection mechanism would take into account the encoding rate variations over a selected smoothing interval. This means that a transmission rate would be less tightly coupled to the instantaneous encoding rate and more tightly coupled to an average of encoding rates over the smoothing interval. This would, as in the explicit rate environment, smooth the otherwise bursty data, spreading out its impact on the network and permitting multiple bursty sources to share a network link.

In this environment the transmission rate could also be affected by feedback from the network or receiver where that feedback provides some indication of a packet loss rate occurring at the selected transmission rate. If the packet loss rate is unacceptably high the transmission rate can be throttled back or down until the packet loss rate is sufficiently reduced.

The selected transmission rate would also have an impact on the process for setting a target encoding rate. Thus in this best effort environment the selected transmission rate would take the place of the allocated transmission rate in determining the source delay and its relationship to a delay bound. If, based on the transmission rate, the encoding rate and the extent to which the buffer is full the source delay is determined to exceed the delay bound then the encoding rate can be adjusted as described above in connection with the explicit rate environment.

It is believed that the smoothing interval in the best efforts environment should also be, at a minimum, as long as the periodicity of the encoded video.

The remainder of the specification will describe two smoothing/cropping algorithms in terms of their application to the explicit rate environment and will summarize results of an evaluation of one of those algorithms. One of ordinary skill in the art will recognize that these two algorithms can be modified for use in the best efforts environment. In each case, rather than generating a rate request, the source would simply select a transmission rate and would drain the source buffer accordingly. The transmission rate could subsequently be modified based not only on the algorithms described but based on feedback from the network or receiver as well. Additionally, in each case, the source delay would be determined with reference to the selected transmission rate rather than an allocated rate. This should be acceptable since over time this selected transmission rate will be analogous to an allocated rate to the extent it reflects feedback from the network or receiver. Thus, as in the explicit rate environment the extent to which cropping will be introduce will depend on the actual rate of transmission and the fullness of the buffer and the coding rate.

B. A First Smoothing Algorithm

As indicated above the present invention selects an interval for smoothing a data rate so as to reduce the need for adjustment of the encoding rate. Two factors of concern are: the delay introduced by the buffering of data at the source buffer, and the network feedback delay in regards to responding to an allocation request. This section will focus on the selection of parameters in regard to the smoothing operation in accordance with a first smoothing algorithm.

In this adaptive smoothing algorithm the smoothing interval is increased as long as the source buffer drain time (i.e., its occupancy divided by the current allocated rate) lies below some threshold. It is useful in practice to be conservative in setting the threshold, i.e., to be somewhat less than the target delay. When the occupancy of the source buffer exceeds the threshold, the smoothing interval is reduced such that the delay introduced by the source buffer is below the target. The smoothing interval may then be increased when the buffer drain time goes below a lower threshold. The hysteresis introduced by having distinct thresholds is found to eliminate some short-term oscillations in the requested rate. In parallel, the maximum rate (really a maximum frame size) is tracked which could be transmitted within the delay constraint, given the current buffer drain time and allocated service rate. If the ideal rate exceeds the maximum rate, then the maximum rate could be imposed on the quantizer in order that the next frame will be delay conformant, the smoothing interval would be set to its minimum, and a requested rate equal to the maximum of either the ideal rate or the smoothed rate is issued. If the requested rate is granted, then it is expected that the period over which the maximum rate is imposed on the quantizer will have a duration which is bounded above by the maximum of the ABR settled-down time, and the time for which the ideal rate continues to increase rapidly.

In this embodiment a smoothing interval is selected with reference to two different delay parameters and that interval is varied in accordance with the buffer delay in relation to those two parameters.

The first delay parameter is a maximum delay, delay_maximum (actually, delay_max*delay_upper_factor). This is used as an upper bound for the delay contributed at the source buffer. When the delay reaches that value, the smoothing algorithm tries to be responsive to the instantaneous frame sizes, so that an attempt is made to drain the source buffer as quickly as possible. The smoothing interval is dropped down to 1 frame in one approach—which means that the instantaneous frame sizes are used for requesting a rate from the network. The instantaneous requested rate corresponds to the ideal rate. This was an initial approach. This approach is susceptible to providing poor performance, however, because if the subsequent instantaneous frames are smaller this results in not taking into account the larger frames that may have been already buffered in the source buffer. Thus it may be more appropriate to gradually decrease the smoothing interval. The intent is to reduce the smoothing interval somewhat slowly, when it is small and more rapidly when the smoothing interval is very larger. Thus, the smoothing interval can be reduced at a rate proportional to its current size.

In one implementation the smoothing interval could be reduced by half every time (i.e., on each frame instant) as long as the delay is above this maximum delay upper bound. An alternative mechanism for smoothing interval reduction might use a dividing factor which depends logarithmically on the current smoothing interval, rather than being constant.

A second threshold or delay parameter is delay minimum (actually, delay_max*delay_lower_factor). This threshold is used as a guideline for increasing the smoothing interval. If the delay contributed is below delay_minimum (this implies that the source buffer occupancy is smaller), the smoothing interval is allowed to increase. The smoothing interval can be increased by 1 every frame instant, as long as the delay is below this minimum value.

A hysteresis range, defined by H=(delay_max* (delay_upper_factor–delay_lower_factor), is a range over which the smoothing interval is not changed. As long as the buffer occupancy is in this range, it is expected that the current smoothing interval is acceptable and is not changed.

A rate requested from the network is based on whether the smoothed rate based on the current smoothing interval is adequate or not. If the rate computed based on the current smoothing interval is large enough that the delay experienced by the current frame is not going to exceed the bound on the acceptable delay (delay_max), then the rate requested will be based on the smoothed value, knowing that the delay bounds will not be exceeded. When the rate required to meet the delay criterion is larger than the smoothing rate, then a larger rate is requested from the network—a rate corresponding to that needed to drain the buffer, including the current frame, within the delay constraint (delay_max).

The requested rate has a safety factor built into it. It is beneficial to ask for a small over-allocation of the rate, over and above the rate that was computed above. This permits draining the buffer, especially when it has been built up, and also the rate request continues to remain high. This is in keeping with the intuition that the mean rate request is likely to be slightly higher than the mean of the source's ideal rate, just so that the system can ride out peaks in the source's ideal rate.

Two possible ways to include the safety-factor:

1) having a safety factor on the rate: where the rate requested is a percentage higher than the request rate computed on the delay criterion as describe above. This tends to be a static request for over-allocation based on the computed rate.

2) base the safety factor on the delay criterion: instead of precisely meeting the delay criterion and requesting a rate to meet that delay bound, one could be conservative and have a delay bound, one could be conservative and compute a rate based on a delay that is smaller than the actual delay bound. This is also a static over-allocation, and is quite similar to case (1) above. It is unclear whether there are significant differences between the two alternatives. It appears that including both has a beneficial effect.

It has been observed that the width of the hystersis interval, H, has an impact on the responsiveness and the overall performance of the smoothing algorithm. Too large a width results in increasing the number of frames that have to be cropped, that is, have their coding quantization parameters altered. Similarly, having a width that is too narrow also results in poorer performance.

C. A Second Smoothing Algorithm

A second smoothing algorithm adapts to the demands of the video source, but imposes controls just when the uncontrolled demand of the sources would lead to excessive delay. The algorithm comprises two parts. The rate request algorithm specifies how the source requests bandwidth from the system. The frame quantization algorithm specifies how the frame sizes are controlled in order to avoid excessive delay.

1. Requested Rate

The rate required of the networks will be estimated as the maximum of two components: one reflecting short term average requirements, and the other based on the typical large frame at the scene time-scale.

As indicated above, the invention is applicable to compressed video that uses compression algorithms such as MPEG. In this case there may be relatively large frames, that are intra-frame coded that occur periodically. These will be interspersed with inter-frame coded frames that may be smaller; these are used to reflect motion and changes from the previous large frame. With MPEG-2, these large frames are the I-frames. The number of frames in a period is termed a Group of Pictures (GOP). A GOP typically consists of one I frame followed by a series of other (not-I), frames, although this need not necessarily be the case.

It is desirable to have a network rate which is smoothed over the GOP period to avoid systematic fluctuations within it, otherwise poor performance can result. Without smoothing, the allocation of rate by the network could systematically lag demand from the source, and the mismatch of a large allocation with a small demand would lead to a wasting of network resources. So, one determinant of the requested rate will be the smoothed rate $r_{sm}=f_{sm}/\tau$ where $f_{sm}$ is the ideal frame size, smoothed over some window of $\omega_{sm}$ frames, and $\tau$ is the inter-frame time. For encodings without a periodic structure we are free to take $\omega_{sm}=1$. In contrast, with encodings that do have a periodic structure $\omega_{sm}$ could correspond to the GOP period.

Whereas $r_{sm}$ gives the average requirement over a small number, $\omega_{sm}$ frames, the larger frames in the smoothed set will suffer increased delay. These large frames are potentially the I-frames in MPEG2, the initial frames of a new scene, or frames relating to those times when there is considerable activity in the scene. The goal is to allocate a rate in order that the delay of these frames does not exceed some target $\tau_{max}$. So we keep track of the maximum frame size $f_{max}$ at the time-scale of scenes of a few seconds, i.e., over some window $\omega_{max}$ which may be substantially larger than the smoothing window $\omega_{sm}$. There are evidently correlations in the frame sequences, especially over intervals of a few seconds (e.g., at the scene time-scale). By keeping track of the peak sizes over this time-scale and ensuring that the rate is adequate to meet their requirements, it is possible to be responsive to the requirements of the scene. Also, it is possible to be responsive to the needs of the periodic, relatively larger I-frames in the I-B-P structure of the frames with MPEG compression. As $\tau_{max}$ increases, so does $f_{max}$, since the maximum frame is taken over a larger window. Selecting $\omega_{max}$ provides a performance tuning knob for this algorithm since increasing it increases the degree to which historical fluctuations in the ideal rate are taken into account in determining the requested rate. This increases quality by reducing the amount that frame will have to be cropped to meet the delay target.

However, just as correlations decay over larger time-scales, the use of the finite window $\omega_{max}$ means that the changes in activity at the scene level are reflected in $f_{max}$. Nonetheless, we do find it useful to keep a historical estimate of $f_{max}$ through autoregression.

The rate we associate with our estimate $f_{max}$ of the maximum frame size is $r_{max}=f_{max}/\tau_{max}$, i.e., the rate required to drain the frame of size $f_{max}$ from an empty buffer within the delay target $\tau_{max}$.

The requested rate in this algorithm is at least the maximum of $r_{sm}$, $r_{max}$. In practice we find that the ratio $f_{max}/f_{sm}$ is usually larger than $\tau_{max}/\tau$. Since the large frames are comparatively isolated, then if the requested rate is allocated, the source buffer will usually be relatively empty immediately before the large frame enters it. This implies that the rate requested, $r_{max}$, is sufficiently large when considered against the average frame. This results in keeping the buffer occupancy small so that when a subsequent large frame arrives the rate is large enough to drain the buffer in the delay max interval.

The requested rate has safety factors built into it. There is a request for a small over-allocation of the rate, i.e., a rate over and above the rate that was computed above. This permits draining the buffer, especially when it has been built up. This is in keeping with the intuition that the mean rate requested is likely to be slightly higher than the mean of the source's ideal rate, just so that the system can ride out peaks in the source's ideal rate. It is also assumed that there is an initial rate allocated to the source, to drain the first few frames, until the feedback arrives from the network in response to the request generated when the first frame is being encoded and transmitted. The initial rate may be what is used for admission control of the video source or could be larger.

Many implementations of this algorithm may be possible; according to how one specifies an algorithm to determine $f_{max}$ and $f_{sm}$ from the ideal rate. In one example demonstrated in the equations that follow, $f_{sm}$ is simply a mean over a window $\omega_{sm}$. The rate $Rmax=f_{max}/\tau$ is implemented as the maximum of two further quantities: firstly the actual maximum ideal frame size $r_{max}$ over a window of size $\cdot_{max}$, secondly an autoregressive estimate $r_{ar}$ of $\gamma_{max}$ over times at which it changes. More specifically, every time the running estimate $r_{max}$ changes to a new value, we update $r_{ar}$ as $r_{ar}$ $new = r_{ar}+(1-)r_{max}$. Other estimates of $f_{sm}$ and $f_{max}$ may be possible.

As for the particulars of the algorithm, the notation for the ideal frame sizes and the parameters of the Rate Request Algorithm are first defined as:

f(n): the ideal size of the $n^{th}$ frame
$\omega_{sm}$: the number of frames for a smoothing window
$\omega_{max}$: the number of frames for a maximum window
$\tau_{max}$: the delay target
$\tau$: the inter-frame time
$\alpha$: an autoregressive factor in the range [0,1] for local maximum frame size
$\beta$: a factor $\geq 1$ for systematic over demand of rate request These are used to construct three rates as follows:

$r_{sm}$: the smoothed ideal rate of the $n^{th}$ frame $$r_{sm}(n) = (\tau\omega_{sm})^{-1} \sum_{i=0}^{\omega_{sm}-1} f(n-i), \qquad (2)$$

with the convention f(n)=0 for $n \leq 0$.

$r_{max}$: The local maximum rate for the ideal frame $$r_{max}(n) = \tau_{max}^{-1} \max_{i=0}^{\omega_{max}-1} f(n-i). \qquad (3)$$

$r_{ar}$: An autoregressive estimate of the historical local maximum rate.

This is defined by taking into account the history of $r_{max}(n)$ only for those frames at which it changes. Let $n_i$, i∈N denote the embedded sequence of frames at which $r_{max}(n)$ changes, i.e., $r_{max}(n_i) \neq r_{max}(n_i-1)$ for the $n_i$ but for no other n. Set $R_{max}(i)=r_{max}(n_i)$ and define the autoregressive sequence $R_{ar}$ by $r_{ar}(0)=0$ and $$R_{ar}(i)=\alpha R_{ar}(i-1)+(1-\alpha)R_{max}(i), \qquad (4)$$

for i∈N. Then our historical estimate of the local maximum frame rate is $$r_{ar}(n)=R_{ar}(i(n)), \qquad (5)$$

where $i(n)=\max\{i:n_i \leq n\}$ is the index of the last frame at which the local maximum changed.

The rate requested of the network at the time of the $n^{th}$ frame is then $$r_{req}(n)=\beta\max\{r_{sm}(n),r_{max}(n), r_{ar}(n)\}. \qquad (6)$$

or $r_{req}(n)$ is equal to an over demand by the factor $\beta$ of the maximum of the smoothed ideal rate of the frame, the local maximum rate for the ideal frame and the historical estimate of the local maximum frame rate.

2. Frame Quantization

It is believed that encoders will be built that will encode frames based on the target rate provided to them on a frame by frame basis. The target rate is computed based on the buffer occupancy at the source and the current (or smoothed estimate of) allocated rate from the network. Also taken into consideration is the maximum delay bound that is allowed at the source buffer.

It is known, based on the current allocated rate, that in one frame time, a certain amount of data from the current buffer occupancy of b(n) is reduced by $\tau^*r_{all}(n-1)$", where $\tau$ is the frame time, and is the current allocated rate. $r_{all}(n-1)$ could in fact be a smoothed estimate of the allocated rate.

Given a delay bound for the delay in the source buffer, $\tau_{max}$, one can also compute what is the maximum frame that can be accommodated based on the current allocated rate, $r_{all}(n-1)$. The difference between the two, as shown below gives an initial value of the frame size that the encoder may generate. In addition, the method applies the consideration that a frame may not be cropped more than a certain amount, so that quality is maintained. This last constraint gives us a value of "γf(n)" as the minimum size the encoded frame should have. The maximum between these two can be taken to find the size for the encoder to code the next frame, n.

Of course, if the value derived is larger than the ideal size for the current frame, as given by f(n), then the value given to the encoder is f(n). The details of an example of this quantization technique will now be described.

In one embodiment, parallel with the rate above, the method tracks the available size $f_{avail}$ for a frame to be drained within the delay target $\tau_{max}$, given the current rate allocation and buffer occupancy. This size is supplied to the encoder. If the ideal frame size exceeds the available size $f_{avail}$, the quantization level in the encoder is adjusted in order that the frame size encoded is reduced to meet $f_{avail}$ if possible, but never by more than some fixed factor. This process is referred to as "cropping." Clearly it is desirable that the frequency and amount of cropping are not excessive. One of the consequences of tracking the scene time-scale maximum frame size is that it is typically only the first frame of a new scene which is vulnerable to cropping.

The Frame Quantization Algorithm has the following data and parameters. The algorithm works at the time-granularity of an inter-frame time. The $n^{th}$ frame is considered to be encoded during the $(n-1)^{st}$ inter-frame time, and placed in the buffer at the start of the $n^{th}$ inter-frame time.

f(n): the ideal size of $n^{th}$ frame b(n): the buffer occupation after adding the $n^{th}$ encoded frame.

$r_{all}$(n): the rate allocated to the source during the $n^{th}$ inter-frame time. This may be a smoothed value (average value over many samples) of the allocated rate over a long interval (from a portion of a frame time to 1 or more frame times.

γ: the minimum proportion of the ideal frame size to be encoded. From these the algorithm derives two sequences of frame times:

$f_{avail}$: $f_{avail}$(n) is the estimated available size for a frame conformant with the delay bound $\tau_{max}$. This is contingent upon the buffer occupancy b(n) after $n^{th}$ encoded frame has been added to the buffer; the most recently allocated rate from the network is used to estimate future rates:

$$f_{avail}(n) = \tau_{max} r_{all}(n-1) - \max\{0, b(n) - \tau r_{all}(n-1)\}. \quad (7)$$

$f_{enc}$(n) is the actual size of the $n^{th}$ frame after encoding, based on maximum frame size calculated at start of its encoding period:

$$f_{enc}(n) = \min\{f(n), \max\{f_{avail}(n-1), \gamma f(n)\}\}. \quad (8)$$

3. Evaluation of the Algorithm

The efficacy of this second algorithm has been evaluated referring to a number of sample traces and by simulating certain aspects of the network configuration. One of those simulations relates to the allocation of a rate by the network.

The allocated rate is simulated as a delayed version of the requested rate, multiplied by a noise process in order to simulate partial satisfaction of rate requests by the network. The delay represents the time taken for the network to respond to rate requests. Until the first such response, it is assumed that a fixed rate is allocated by the network. This is presumed as being allocated by the network at connection setup time, possibly as a function of parameters supplied by the source.

The noise process in the rate allocation arises as follows. An admission control scheme is assumed which guarantees that over-subscription of the link capacity by the aggregate requested demand is sufficiently rare and short-lived. It is assumed that the rate allocation mechanisms in the network act by allocating a rate to each source in proportion to its requested rate, so that the total allocated rate over all sources is no greater than the link capacity. One can investigate the frequency, duration and magnitude of such events through simulations of the aggregate requested rate, and in particular its crossing of the link capacity. Rare excursions above a level may be bursty. For this reason, for simulations, the dependence of the allocated rate on the requested rate is modeled by using a two-level model with the following parameters:

ρ: proportion of rate request granted during congestion p(n): Markov chain on the state of space {ρ, 1}

$T_l$: mean lifetime of state {1}

$t_p$: mean lifetime of state {ρ}

δ: number of frame delay in network responding to rate requests $r_0$: initial rate supplied by network.

With these definitions, the allocated rate is then simulated by $$r_{all}(n) = \begin{cases} p(n) r_{req}(n-\delta) & n > \delta \\ r_0 & n \leq \delta \end{cases} \quad (9)$$

The buffer evolution is $$b(n) = f_{enc}(n) + \max\{0, b(n-1) - r_{all}(n-1)\tau\}. \quad (10)$$

The results of analysis and a frame-level simulation of this smoothing algorithm with a variety of different MPEG 1 and MPEG 2 video traces.

The frame-size traces used in the experiments fall into 5 sets. FIG. 2 describes the individual traces in more detail. Those trace sets are:

A. An MPEG-2 encoding of a 40680 frame portion of "The Blues Brothers", with M=1. There is no periodic structure. The frame rate was 24 frames per second.

B. A 174138 frame MPEG-1 trace of "StarWars" movie. The GOP is 12 frames with an IBBPBBPBBPBB pattern. Frame rate 24 frames per second.

C. H.261 encodings of 5 video-teleconferences, of either 7500 or 9000 frames. Each has an initial I-frame, followed by P frames only. Frame rate of 30 frames per second.

D. H.261 encodings of 2 videoteleconference traces. No periodic structure. Frame rate 25 frames per second.

E. 19 MPEG-1 traces, each with 40,000 frames. They originate from cable transmissions of films and television. The GOP is 12 frames with an IBBPBBPBBPBB pattern. For the experiments a uniform rate of 24 frames per second was assumed.

a. Source Rate Behavior

The first thing to look at is the dynamic behavior of the smoothed rates produced by this algorithm to show its benefits, in terms of both reducing the magnitude (because the buffer can drain out large frames over a period greater than a frame time but within the delay bound) and the variability (because the smoothing algorithm tries to find a piecewise average rate for the request) of the requested rate in comparison to the ideal rate at the video source. Using the differences between the ideal rate and the encoded rate, it is demonstrated that reductions in the quality of the video-due to frame cropping in order to meet the delay bound-are extremely rare.

In all of this analysis it is presumed that $\omega_{max}$ is 1000 frames, and that there is a systematic over demand of the rate request, β=1.05 (i.e., a 5% over allocation). The rate request for the initial frame is chosen to be approximately the long-term mean ideal rate, and the delay target was chosen to be 90 milliseconds, conservatively below the maximum delay of 100 milliseconds. For the Blues and StarWars traces, the smoothing window was 12 frames (i.e., $\omega_{sm}$=12). For the video teleconferencing traces, $\omega_{sm}$=1.

Figure 3:
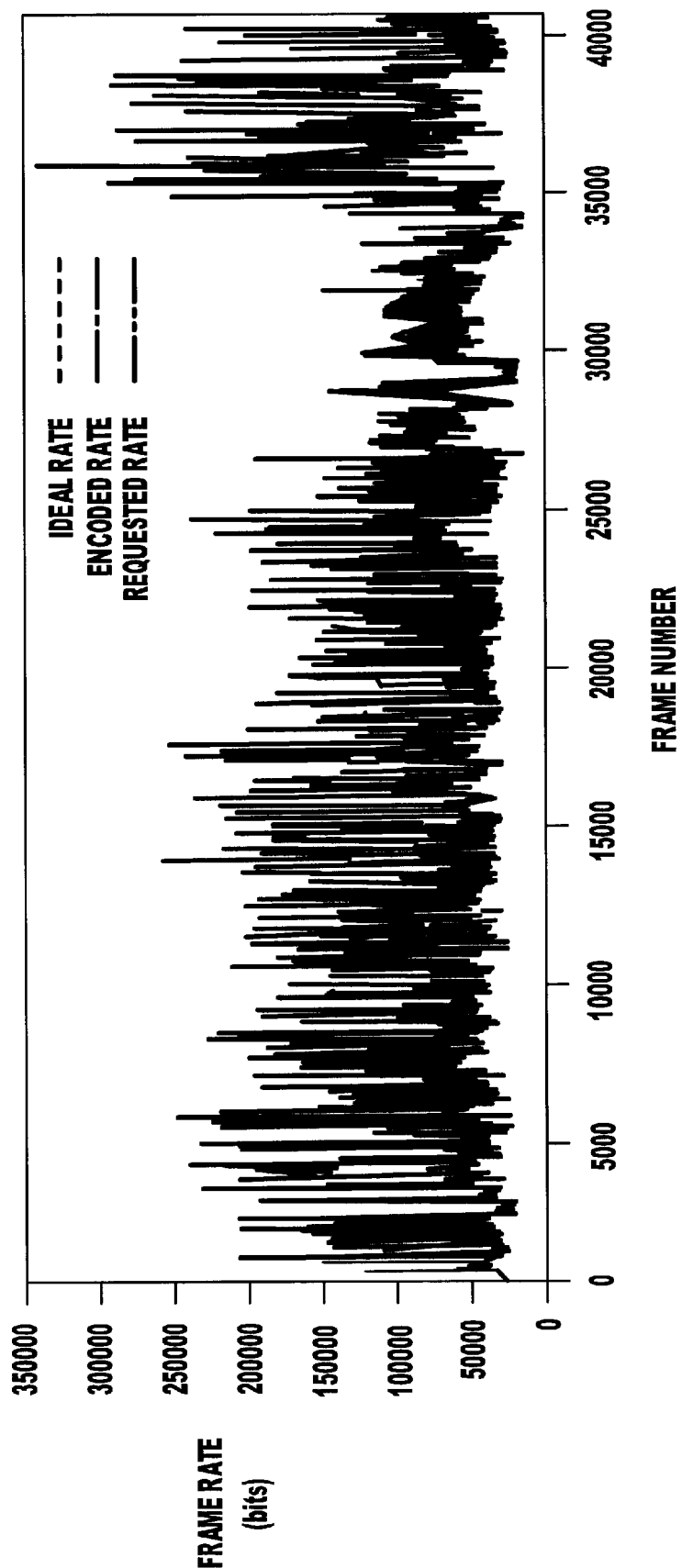
Figures 4, 5:
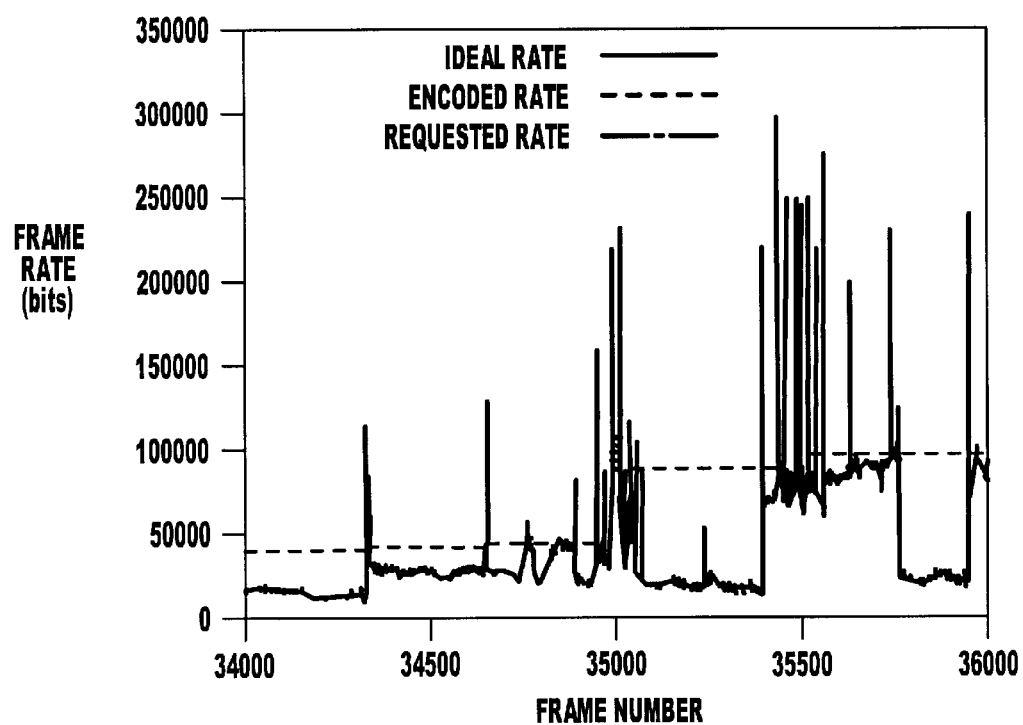

The behavior of our algorithm is first examined using the Blues and StarWars traces. FIG. 3 shows the three rates over the Blues trace entire 40680 frame sequence, and FIG. 4 shows the behavior of the rates over a shorter interval of 2000 frames to show the detailed behavior. The first plot reflects the variability in the ideal rate, ranging from roughly 50000 bits to 350000 bits per frame. The encoded rate almost overlaps with the ideal rate, though it is only infrequently less. A guideline for quality was that no more than 0.1% of the frames should suffer more than 20% rate reduction.

In the experiments only a proportion of 0.001057 of the total frames suffered more than 20% reduction in the encoded rate. In fact, only a proportion of 0.003220 suffered any rate reduction at all. With StarWars, the quality is even better, with only $8.6 \times 10^{-5}$ of the frames suffering more than 20% rate reduction, and only 0.00092 of the frames suffering any reduction at all.

From the summary statistics for the "Blues Brothers" trace with the smoothing, in the table in FIG. 5, it is observed that mean ideal rate is about 54823 bits (per frame) and the mean encoded rate is 54755 bits. The mean requested rate is 100983 bits, a factor of 1.8 over the mean ideal rate. Inspection of the quantities of the frame sizes show the benefit of the algorithm. The 99.0 percentile of the requested rate is slightly higher than for the ideal rate. However, this is the largest request which occurs, while the quantities of the ideal rate increase to a maximum (the $100^{th}$%) which is over twice the maximum requested rate. Notice also that the encoded rate is only slightly less than the ideal rate, implying that the quality reduction is small. The results for StarWars are similar, as shown in the table in FIG. 6. The table of FIG. 5 also shows that the delay is also well-behaved, with the maximum delay introduced by the source buffer within the target of 90 milliseconds that we chose for this run.

FIG. 4, which is the detail over 2000 frames, the behavior of the rates is clearer. There are 5 occurrences where the encoded rate is less than the ideal rate. The requested rate is relatively flat, with a small number of steps over the 2000 frame sequence. The requested rate does not change substantially at the shorter-lived peaks of the ideal rate. This is because these peaks are accommodated in the buffer without exceeding the delay bound. But a burst of large frames, such as occurs around frame 35000, increases the local smoothed rate $r_{sm}$, and hence the requested rate, in order to accommodate the burst. This can be seen in brief excursion of the requested rate around frame 35000. The smoothing window is $\omega_{sm}$=12, so $r_{sm}$ quickly relaxes downwards after the burst has passed. However, the first large frame in this burst which would violate the delay bound causes an increase in the maximum rate $r_{max}$ which will persist for $\omega_{max}$1000 frames. So although the ideal rate drops down after the burst, the requested rate is kept high in anticipation of further large frames from the current scene (i.e., based on the expectation of high short-term correlation). If the inactivity period were to last longer than $\omega_{max}$, then the requested rate would drop down. In this example, there is yet another burst around frame number 35500 with several large frames. This causes a further increase in the requested rate to meet the requirements.

Notice that even with such large bursty behavior in a sequence of nearly 500 frames, only 1 frame suffers any degradation in this sequence (in fact, no frames suffer more than 50% rate reduction over the entire trace of 40,000 frames). At the same time, the variability of the requested rate (which the network has to tolerate) is substantially less. Furthermore, higher multiplexing gains are likely to be achieved by the fact that the requested rate is so much smaller than the peaks of the ideal rate from the source. For example, the requested rate has a peak near 150000 bits per frame in comparison to the ideal rate's peak near 300000 bits per frame, near frame number 35500. The multiplexing properties of the requested rate will be investigated in more detail below.

b. Behavior of Delay in Source Buffer

Figures 6, 7:
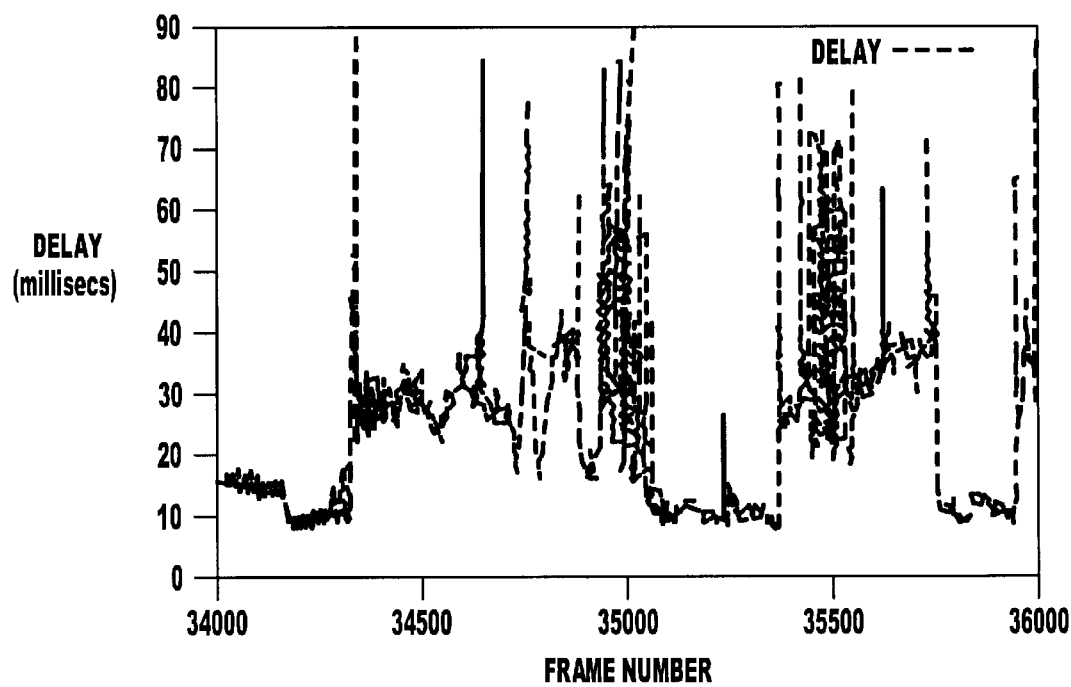

FIG. 7 shows the behavior of the delay introduced per frame at the source buffer in milliseconds for the 2000 frame sequence. There is a target of 90 milliseconds for this delay beyond which the encoders caused to "crop" (reduce) the frame size. This target delay has been conservatively selected so that a stringent delay bound of 100 milliseconds at the source buffer is not exceeded. The delay behavior mimics the pattern of behavior for the rates. However, the larger delays occur not just at the peaks for the rates, but more at the transitions from the low activity to a higher activity sequence. For example, around frame 34250, the rate change is relatively small. But, the delay observed for the frame is large. This is because the requested rate was tracking a much lower rate, which causes a buffer buildup for this new, even slightly larger frame. The requested rate is increased to track this new level of activity, which then brings the buffer occupancy down. The primary observation to make is that the buffer occupancy, reflected by the delay, is kept low in periods of lower activity, so that when a new large frame shows up, or when there is a scene change, there is an adequate free buffer to accommodate the large frames.

C. Reduction in Quality

Figures 8, 9:
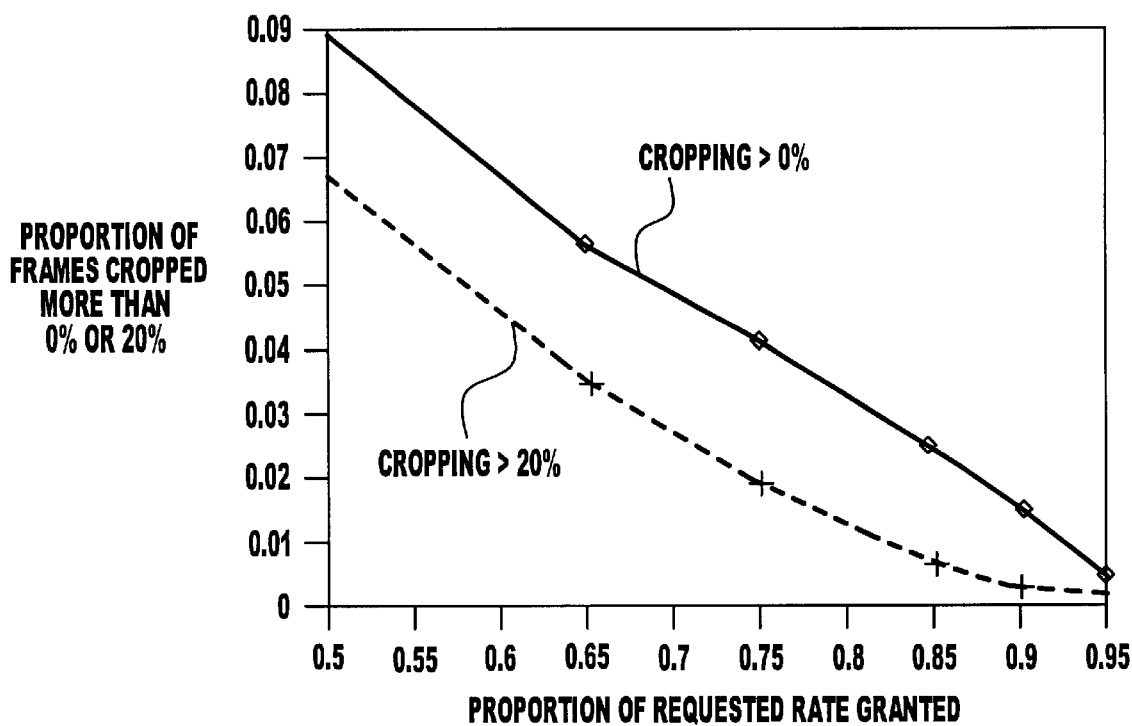

One concern with this form of adaptation of compressed video is the degree of compromise as to the quality. A quantative value chosen for acceptability is that there should be no more than a 20% reduction in the frame size, and even that should not occur more than once every thousand frames (0.1% of the time). The extent of degradation in quality for the "Blues Brothers" video, with varying feedback delays from the networks are shown in the table of FIG. 8. The target for the proportion of frames not suffering more than 20% reduction in the frame size is clearly met. In fact, only 0.3% to 0.4% of the frames suffer any rate reduction at all.

As seen in the table, the reduction in quality shows a slight sensitivity to the feedback delay. Even with a feedback delay of 4 frame times (about 166 milliseconds) the maximum delay was 105 ms, the next largest delay being 98 ms. We feel this reduction is well within reasonable levels of our target in quality degradation.

Another measure of quality is also shown in the table of FIG. 8. The number of consecutive frames that suffer more than a threshold (20%) of cropping (frames considered "failures") is another measure of quality. It is expected that the lower the number of consecutive failures, the better the quality. In fact, to be conservative, when the number of consecutive successes (i.e., frames with less than 20% rate reduction) is less than a GOP (12 frames from Blues), these frames are amalgamated into the previous string of failures. It is also of interest to note the string of frames that are successes (i.e., no frame in a string of consecutive frames suffer a rate reduction greater than the threshold of 20%). In the table the mean value for the number of consecutive failures ranges from 3.25 to 4, for varying feedback delays. In contrast, the mean value for the number of successful frames is around 2000. When the feedback delay is 4 frames, the longest string of failures was 8 frames. Furthermore, the total number of consecutive strings of failures was only 26 and total number of frames suffering more than 20% rate reduction was 67. This was for the trace of 40680 frames.

Variation in quality was also examined as the source delay target $\tau_{max}$ varied. Not surprisingly, mean and peak request both increase as $\tau$ is decreased. For the Blues trace at $\tau$=50 ms the mean request rate is almost 3.24 times the mean, compared with 1.84 times the mean at $\tau$=90 ms. The proportion of frames that suffer a degradation in quality increases slightly with increasing delays—a somewhat counter-intuitive result. This is because the uncertainty increases as the size of the source buffer increases. The occasions when the amount of data in the source buffer is higher thus causing a subsequent frame to be cropped is slightly more frequent. However, no frame suffers a rate reduction of 50% or more in any of these experiments.

d. Effect of Rate Reduction by the Network

The results so far have used an allocated rate from the network which is the rate requested by the source, but with a feedback delay. Now the effect of congestion in the network, which results in the rate allocated to the connection being less than the requested rate, will be examined. Congestion is modeled simply by a two-state (ON-OFF) Markov process as described above. During the ON-period, of mean duration $T_I$, the rate returned from the network is the requested rate. During the OFF-period, of mean duration $T_\rho$, the rate returned is a proportion $\rho$ of the requested rate. In the following, the impact on quality and delay is examined when the ON-OFF intervals are: $T_I$=300 frames, $T_\rho$=50 frames, and $\rho$ varies from 0.5 to 0.95.

FIG. 9 shows the behavior of the degradation. The upper curve shows that the proportion of frames suffering any cropping at all increases nearly linearly as $\rho$ is reduced; going from 0.4% when $\rho$ is 0.95 to 9% when $\tau$ is 0.5. The lower curve shows the proportion of frames that suffer more than 20% cropping. Observe the comparative flatness of the portion of the lower curve between $\rho$=0.85 and $\rho$=0.95: the amount of degradation due to cropping by greater than 20% is comparatively insensitive to $\rho$ here. Evidently the source buffer is able to absorb the difference in the requested rate and the allocated rate. However, when the network severely reduces the rate allocated (i.e., $\rho$ is quite a bit less than 1), then the source buffer is no longer able to ride out these congestion events, and the video suffers the inevitable quality degradation.

Figures 10, 11:
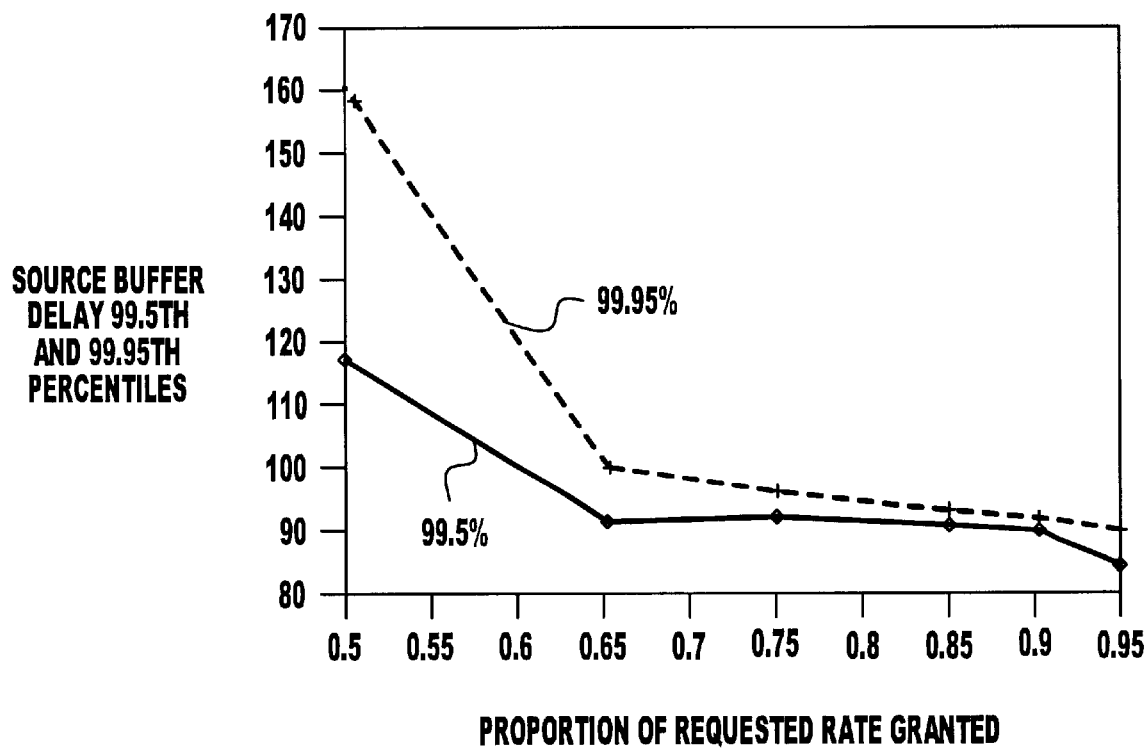

FIG. 10 shows the behavior of the delay for varying $\rho$, with the same ON-OFF model for congestion episodes. The 99.5$^{th}$ percentile remains below 90 milliseconds when $\rho$ decreases to 0.65. The higher percentiles of delay increase somewhat more as $\rho$ drops from 0.95, the 99.95$^{th}$ percentile being 100.66 milliseconds at $\rho$=0.64, which is just around the target.

It appears that the behavior of the delay is not quite as sensitive to reductions in $\rho$ (in the range of 0.95 to 0.65) as the quality measure was: the frames are being cropped in order to meet the delay target. However, the minimum allowed cropping $\gamma$ from above was set to 0.5; as $\rho$ approaches this value, progressively more frames that will not meet the delay target are placed in the buffer.

In conclusion, it is relatively important to perform a sufficiently conservative admission control policy that results in $\rho$ being in the range of 0.85 to near 1. More substantial rate reductions result in penalizing the quality of the video. However, these observations are all based on a single trace. Subsequent sections will address the benefits of multiplexing several sources, and the impact of congestion causing the allocated rate to be smaller than the requested rate.

e. Comparison with Video Teleconferencing Traces

The effectiveness of the algorithm is now examined with respect to the video-teleconferencing (VTC) traces. The first traces to look at are those of set C (Anwar, Dave, Ted, Pat and Yan) listed in the table of FIG. 2, as well as those of set D (two other, higher-rate teleconference traces, Partho-1 and Partho-2). The smoothing parameters were, $\omega_{sm}$=1, and $\beta$=1.05. The results for the Blues trace, whose parameters were identical, except for $\omega_{sm}$=12 are also included. All the results were for a network feedback delay of 1 frame time. The first 5 VTC traces (set C) are characterized by an initial, large I frame, followed by much smaller P frames. Although the delay for the first frame tends to be somewhat dependent on the initial rate, the initial rate continues to be approximately equal to the long-term mean of the ideal rate. This tends to skew the results somewhat, with the measured quality degradation being higher than it would be if we were to ignore the first frame. The table of FIG. 11 shows the summary statistics for 5 traces.

Because the first 5 VTC traces tend not to have a substantial peak to mean ratio, the benefit is primarily obtained from the source smoothing and rate-adaptation mechanism. The quality (measured by the proportion of frame suffering more than a 20% rate reduction) is very good across all the traces, and in particular for the two higher rate VTC traces (set D Partho-1 and Partho-2). The mean requested rate is higher than the mean ideal rate by a factor ranging from 1.15 (for the longest trace with more variability) to 2.1 (for the shortest trace with the least variability). Some of this may be caused by the large requested rate for the first large I-frame, which may skew the result. In all of these cases, the peak requested rate is higher than the peak ideal rate, by a factor of 1.05, which is precisely the factor $\beta$.

f. Variable Quality and Responsiveness

Assuming that the rate requested by a flow is satisfied according to the requirements described above, the main determinant of per flow quality is $\omega_{max}$, the window over which the local maximum frame size is determined. This suggests two ways in which applying differing values of $\omega_{max}$ at the source adapter (that drains the source buffer) can be employed:

Variable Static Target Quality—Not all applications, or instances of them, will have the same quality requirements. For example, one expects that users of entertainment video will have stricter quality requirements than video teleconferences. Thus by tuning $\omega_{max}$ approximately, the desired quality can be obtained. See the table of FIG. 12 for quality resulting from application of different values of $\omega_{max}$ to the trace of Set A, and the table of FIG. 13 for one from set C. As one might expect, higher quality requires higher requested bandwidth.

Dynamic Achievement of Target Quality—If a quality target is explicitly given, and quality can be measured at the adapter, then $\omega_{max}$ can be increased until the target quality is reached. For example, the target quality used in this paper is that no more than 0.1% of frames shall suffer more than 20% frame cropping. So a historical estimate of the frequency with which $f_{enc}/f_{max}$ falls below 80% would be kept; if the estimate were to rise above 0.1%, an increase in $\omega_{max}$ would be triggered. The consequent increase in requested bandwidth has implications for the network: it might violate the assumptions under which the flow was admitted. However, in any case such an adjustment should be in response to long term failures in quality, based on average quality over a far larger timescale than $\omega_{max}$. If such time-scales are long compared with those at which flows enter and leave the network, then upward readjustment of the long term mean requested rate should not compromise the admission control mechanism.

The smoothing algorithm described has two components of smoothing, as described above: the short-term smoothing window $\omega_{sm}$ and the medium term maximum window $\omega_{max}$. In this evaluation $\omega_{sm}$ has been nominally chosen to be of the order of 12 frames, the GOP length of the traces in set E. The maximum window $\omega_{max}$, which aims to capture characteristic large frames of a scene, was nominally set to 1000 frames. The sensitivity of the algorithm, specifically its quality and bandwidth usage, to these two smoothing parameters will now be analyzed.

Figure 14:
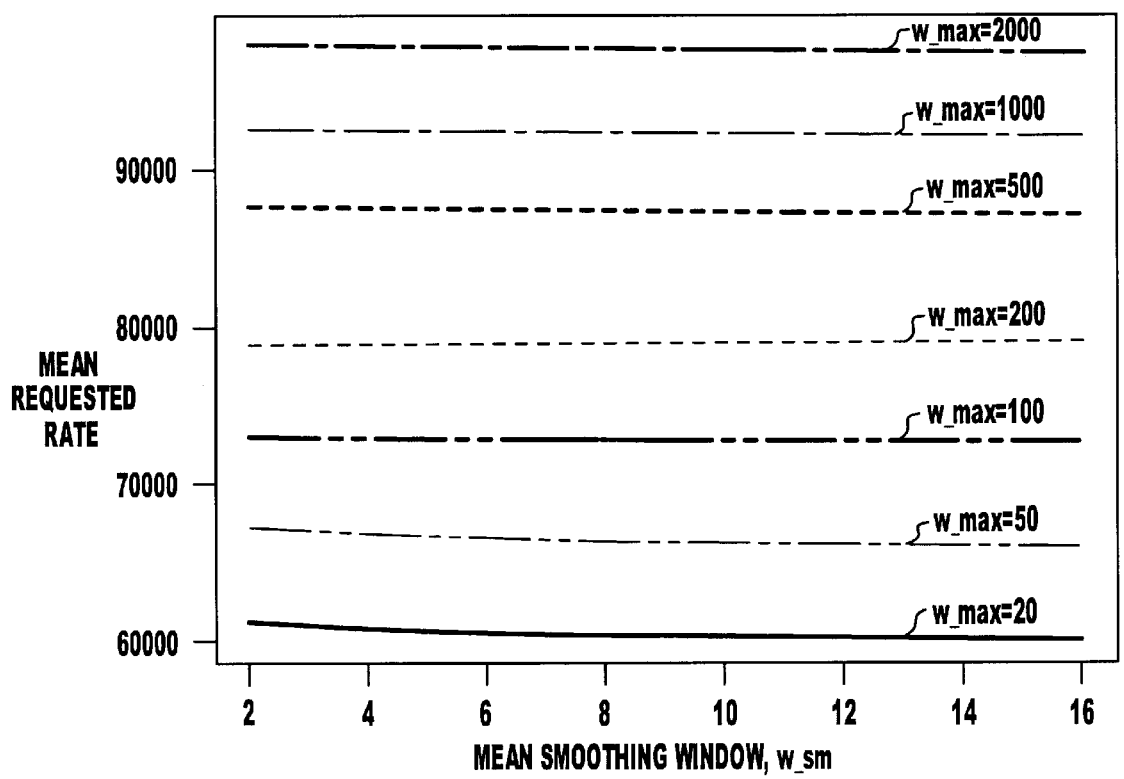
Figure 15:
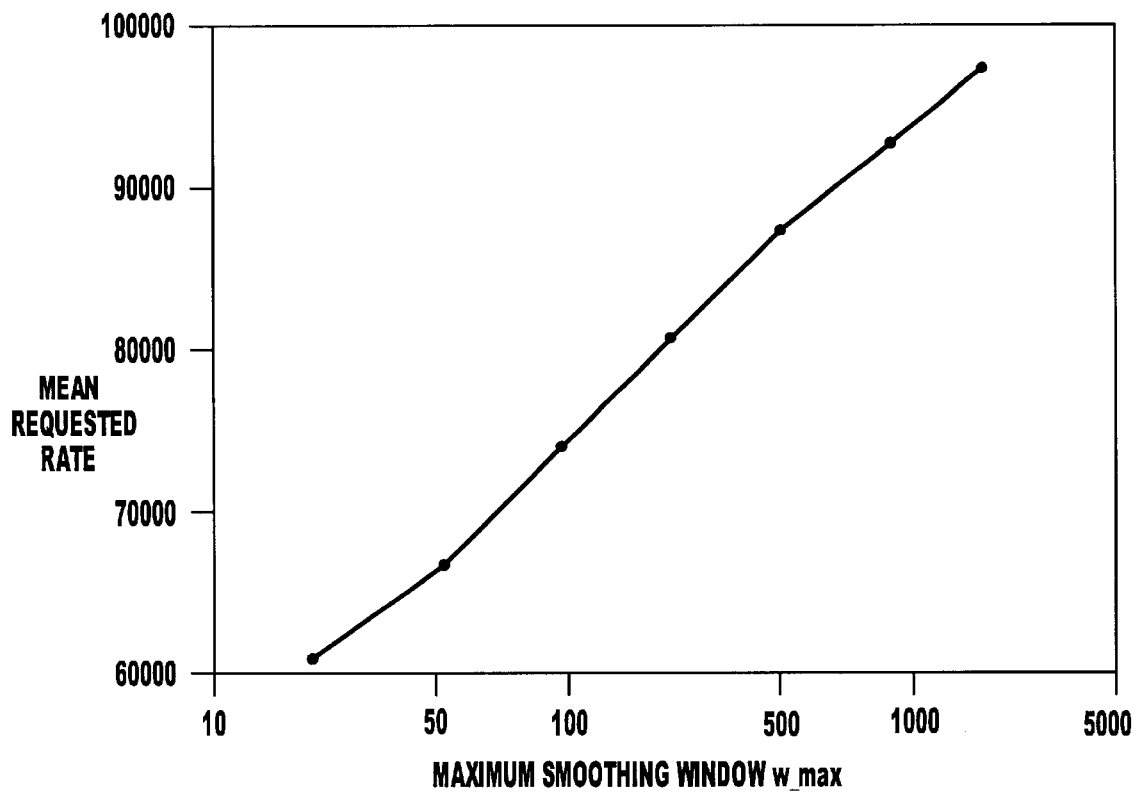

FIG. 14 shows the variation of the mean requested rate as both $\omega_{max}$ and $\omega_{sm}$ are varied. As we observe from the figure, there is very little sensitivity to the value of $\omega_{sm}$. There is a small reduction in the mean requested rate as $\omega_{sm}$ is increased from 2 to 6 or 8 frames. Beyond that, there is almost no change in the mean requested rate. However, it is clear that there is considerable sensitivity to the value of $\omega_{max}$. This is isolated in FIG. 15 by plotting the average over $\omega_{sm}$ of the mean requested rate as a function of $\omega_{max}$—Note the logarithmic horizontal scale. As $\omega_{max}$ is increased, the mean requested rate increases, reflecting the fact that one large frame tends to have an effect over a longer period of time. The mean requested rate increases slowly with $\omega_{max}$—approximately logarithmically-going from 60000 bits/frame when $\omega_{max}$ is 20, to nearly 90000 bits/frame when $\omega_{max}$ is 1000.

Figure 16:
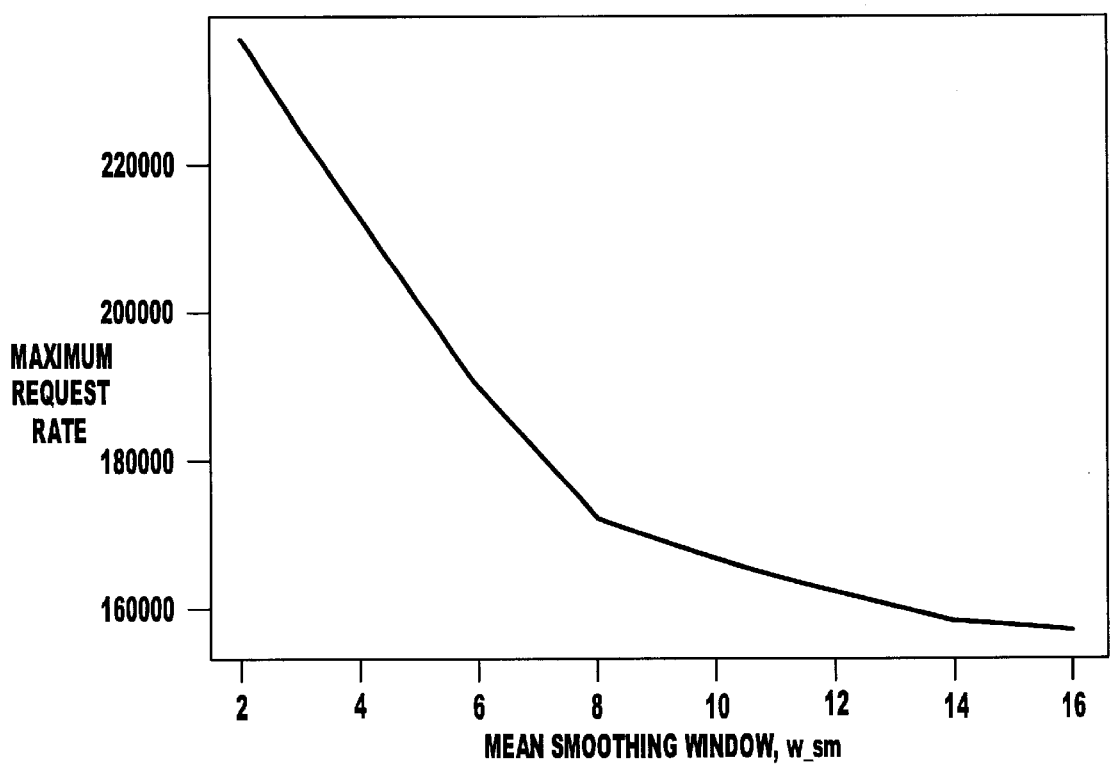

The maximum requested rate is insensitive to $\omega_{max}$, as shown in FIG. 16 the curves of the maximum request as a function of $\omega_{sm}$ coincide for $\omega_{max}$ in a range from 20 to 2000. However, the maximum requested rate is a decreasing function the smoothing window $\omega_{sm}$. It reduces rapidly as $\omega_{sm}$ increases up to 8. Beyond that, we begin to reach a point of diminishing returns, and the maximum requested rate reduces slowly as $\omega_{sm}$ goes beyond the GOP value of 12. The form of dependence on $\omega_{max}$ and $\omega_{sm}$ indicates that the largest requested rate is governed by the short-term average over a few large frames and the mean requested rate is governed by the large frames observed over a longer, scene-level, timescale.

Figure 17:
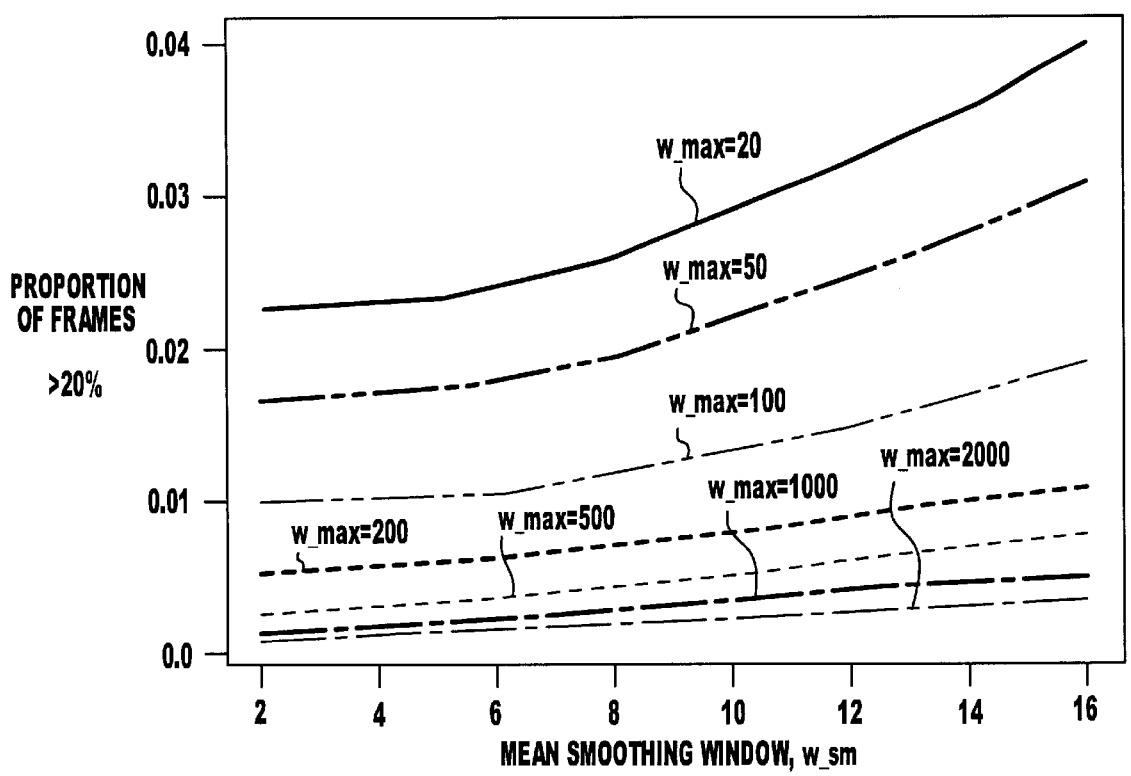
Figure 18:
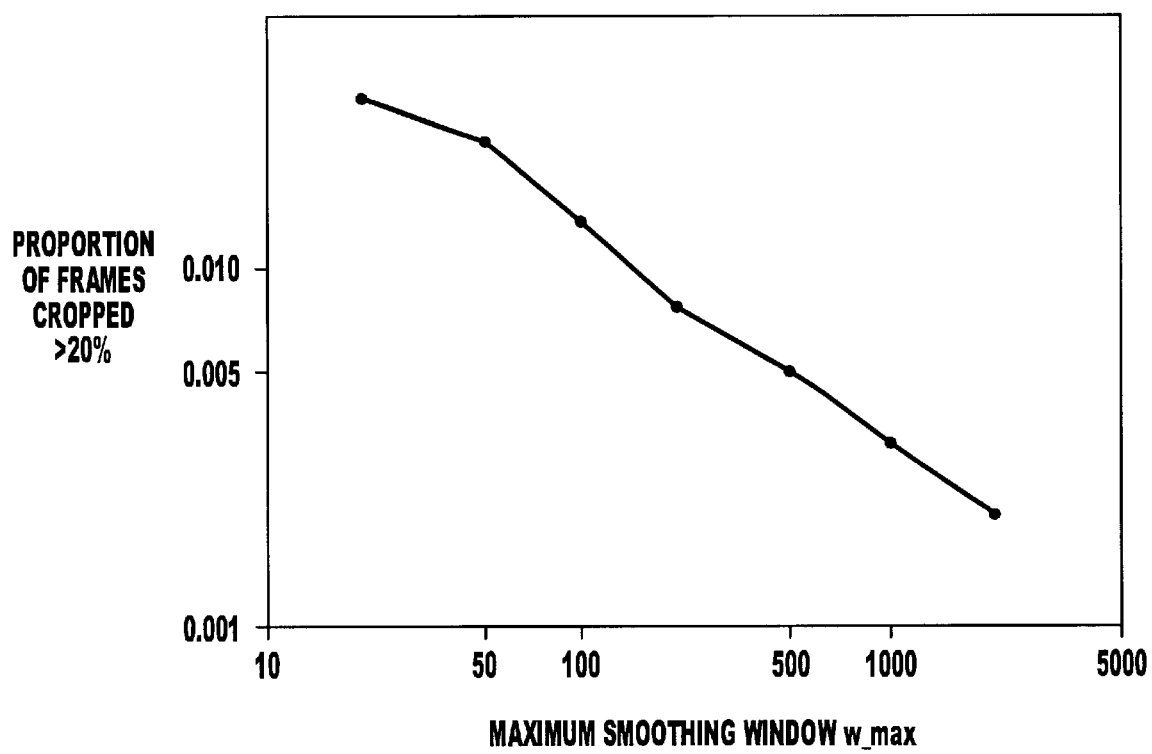
Figure 19:
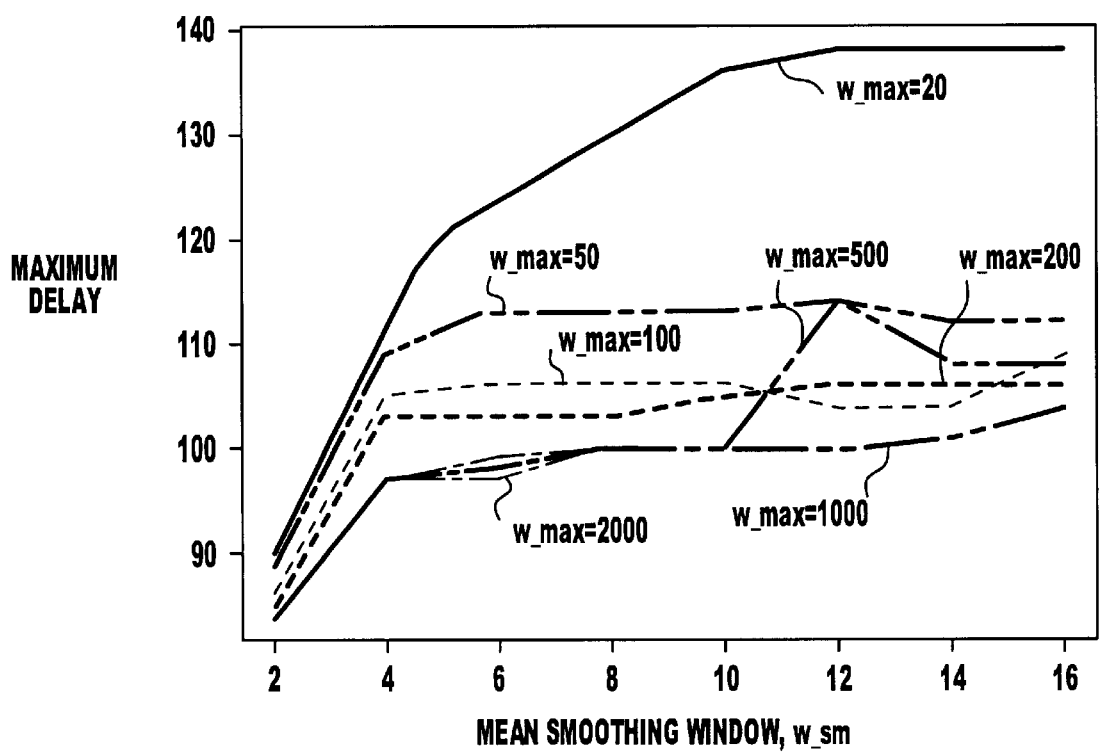

The impact on quality is likely to be of more interest as the two parameters are varied. FIG. 17 shows how the proportion of frames cropped by more than 20% varies. The primary sensitivity is once again to $\omega_{max}$. For values of $\omega_{max}$ greater than 100, the proportion of such frames remains below 0.5% for the entire range of $\omega_{sm}$ we examined. For smaller values of $\omega_{max}$, less than 100, the proportion of cropped frames shows a small amount of sensitivity to $\omega_{sm}$. However, the primary sensitivity to $\omega_{sm}$. However, the primary sensitivity of the quality is to $\omega_{max}$; see FIG. 18. Note the log-log scale: the proportion of frames cropped more than 20% decays slowly, as a power law, in $\omega_{max}$(in fact≈const. $\omega_{max}^{0.85}$) For the acceptability criterion selected (no more than 0.1% of frames cropped >20%)$\omega_{max}$ needs to be reasonably large, on the order of 500 frames or more. This supports the initial intuition that $\omega_{max}$ needs to capture the scene-level behavior, which is likely to be on the order of a few seconds. The statistics of the burst length of cropping with varying $\omega_{sm}$ and $\omega_{max}$also observed. Generally, the mean burst length ranged from 1.5 to 3.5, increasing with $\omega_{sm}$. The maximum burst length was a decreasing function of $\omega_{max}$, in a range from 25 to 2, and generally increasing in $\omega_{sm}$. Finally, FIG. 19 shows that maximum source buffer delay is reasonably insensitive to $\omega_{sm}$ once $\omega_{max}$ is greater than about 50 frames; it is within the 100 kms target for $\omega_{max}$1000. In summary, $\omega_{max}$ is the main tunable parameter determining quality.

Figures 20, 21:
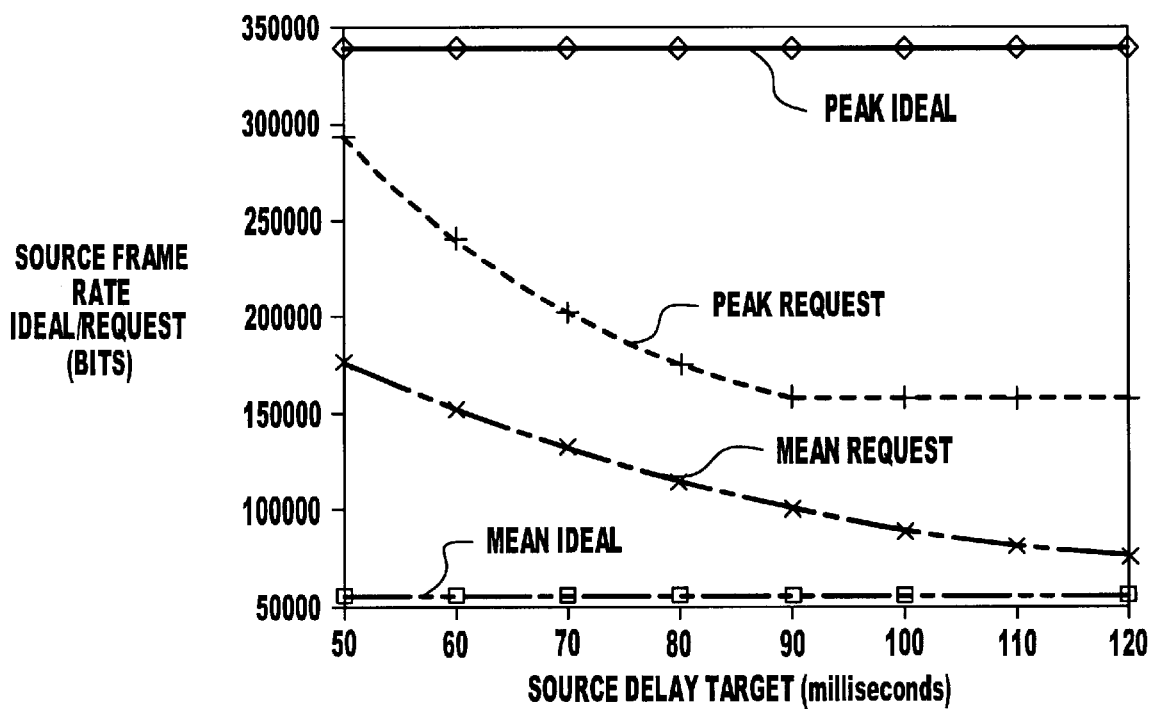

Up to now, the performance of the algorithm was evaluated with a source buffer delay target of 90 milliseconds. The sensitivity of quality to the delay target, as it varies from 50 milliseconds to 120 milliseconds, for Trace A was also examined. FIG. 20 shows the variation of the mean and peak for the requested rate from the source as we vary the delay target. The mean ideal rate (in terms of bits/frame) is 54823 bits. The mean request rate (to achieve the desired quality target) obviously is higher than that for the ideal rate, but decreases as the delay target at the source becomes larger. When the delay target is 50 milliseconds (the frame time is 41.6 milliseconds), then the mean request rate is almost 3.24 times the mean ideal rate. A large rate is requested from the network to ensure that the buffer occupancy is kept low to accommodate the 50 ms delay target. However, when the target delay is 100 milliseconds, the mean request rate is 1.68 times that of the ideal. The larger the source buffer, the smaller the overall rate that needs to be requested from the network while still meeting the quality target. Also shown in FIG. 20 is the behavior of the peak for the ideal and requested rates. The peak requested rate drops rapidly from 296400 bits for a source target delay of 50 milliseconds, to 164653 bits for a delay of 90 milliseconds. However, the peak rate does not drop further, and in fact remains flat for this trace, when the delay target increases further from 100 to 120 milliseconds. It is important to note that the ratio of the peak ideal rate to the peak requested rate (when the target delay is 90 milliseconds) is about 2.06, which is a substantial benefit derived from the algorithm.

The table of FIG. 21 shows more details on the degradation in quality relative to the source target delay, varying from 50 to 120 milliseconds. Also shown is the mean delay at the source. The 99.99$^{th}$ percentile and higher (also the maximum delay) are consistently below the target delay chosen for the particular experiment.

It is observed that the proportion of frames that suffer a degradation in quality increases slightly with increasing delays—a somewhat counter-intuitive result. This is because the uncertainty increases as the size of the source buffer increases. It should be seen the source buffer is full enough to cause a subsequent frame to be cropped slightly more frequently. However, no frame suffers a degradation of 50% or more in any of these experiments. This is also well within the quality target of no more than 0.1% of frames suffering more than 20% degradation.

It is clear from the above that there is a tradeoff between the source target delay and the rate requested of the network. The requested rate goes up as the target delay becomes smaller. Note that the algorithm of the present invention is still able to maintain quality within acceptable delays even while meeting the much smaller delay target.

As described above, the algorithm systematically over-requests rate by a factor $\beta$>1 relative to its calculated needs. This allows a built-up source buffer to drain while awaiting feedback from the network, especially on arrival of a large frame. Subject to achieving our quality targets, the smaller one can make $\beta$ the better, since this will use less network resources.

In the results reported so far, $\beta$ is 1.05. This subsection examines the sensitivity to $\beta$, using trace A, varying $\beta$ from 1.3 down to 0.9, especially with respect to the extent to which frames are cropped. When β is 1.0, this implies that there is no over-request. β of 0.9 means persistently asking for only 90% of the required rate which causes a buildup at the source buffer. This has the potential of degrading the quality, since it would trigger the reduction in the target rate to the encoder and result in cropping the frame.

Figures 22, 23:
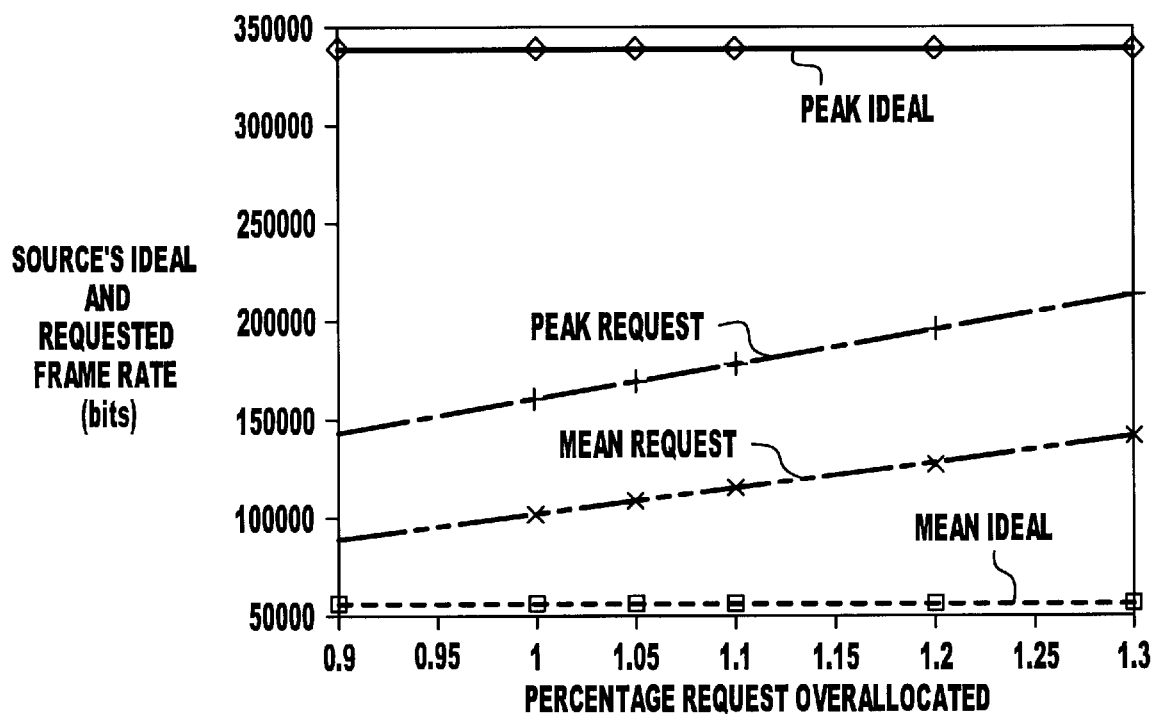

FIG. 22 shows the mean and peak for the requested rate, with varying β. As requested, the peak rate increases linearly with β. The mean requested rate has a slightly lower slope reflecting a small amount of short-term smoothing that occurs with the source buffer. Also shown in the figure are the mean and peak values for the ideal rate for comparison. As observed before, the requested rate is higher than the long-term mean ideal rate, but substantially lower than the peak ideal rate. However, it is believed that the amount that the requested rate increases is not that much, even with β of 1.3, but the improvement in the quality observed appears to be worthwhile.

Examining quality, when β=1.0, the table of FIG. 23 shows that the proportion of frames suffering cropping greater than 20% is 0.18%, slightly above the target of 0.1 %. However, even when the request consistently only asks for 90% of the rate required, the percentage of frames that suffer a cropping greater than 20% is still only 2%. In fact less than 9% of the frames suffer any cropping at all. The algorithm also doesn'st allow the mean delay in the source buffer to grow excessively. With β of 0.9, the mean source delay is 34.2 milliseconds, still quite reasonable.

Figure 24:
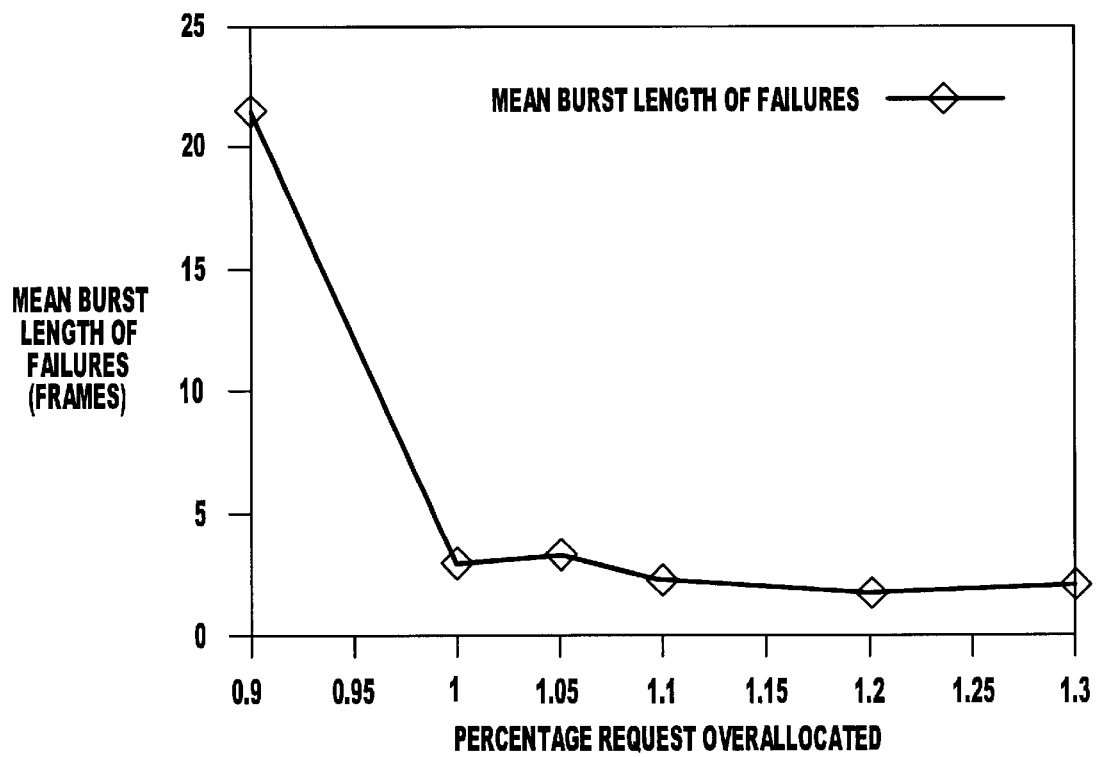
Figure 25:
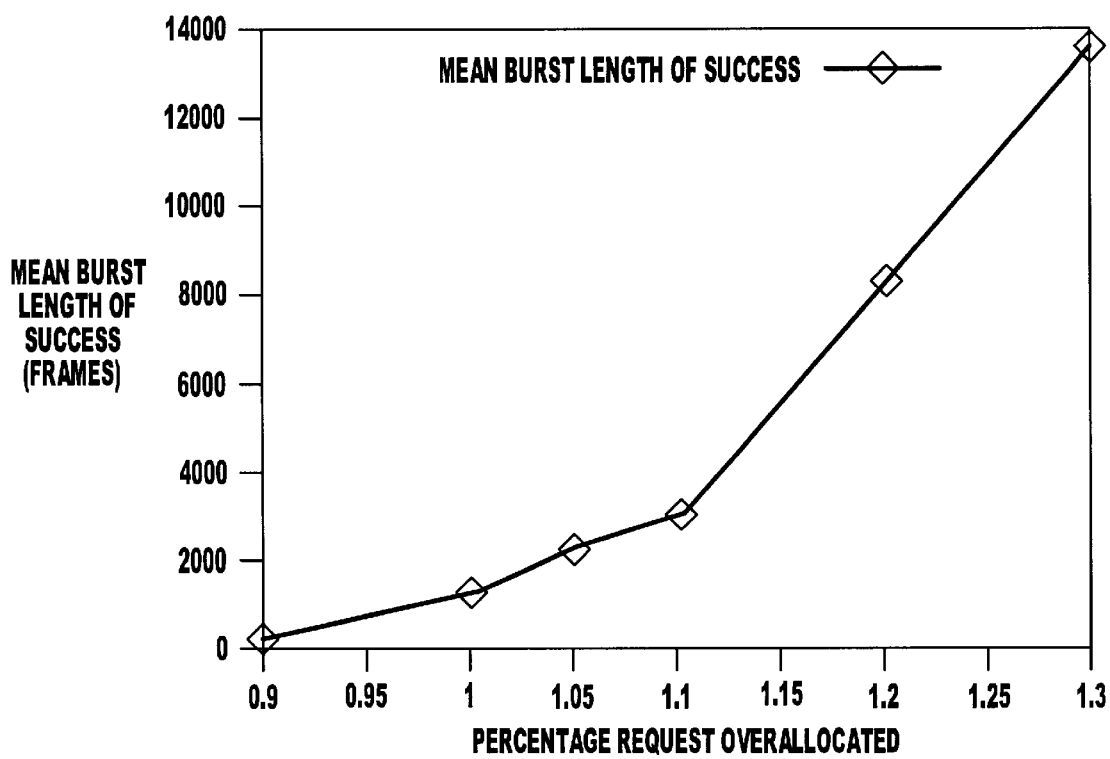

FIGS. 24 and 25 explain the impact of , on quality. The mean burst length of cropping >20% is relatively small, ranging from less than 1 to about 3 frames, as long as β is 1.0 or greater. The lengths of these bursts are relatively insensitive for β greater than 1.0. However, when β=0.9, the mean burst length of cropping >20% grows quickly to over 20, indicating that the quality may not be acceptable. Thus, looking more carefully into the dynamic behavior of the algorithm was needed to show that in fact bringing β down to 0.9 may impair the quality. In addition, it is revealing to examine the effect of β on the length of the complementary bursts of consecutive frames cropped no more than 20%. Increasing β from 1.0 to 1.3 dramatically increases the mean complementary burst length from near 2000 frames (a duration of over 1 minute) to nearly 14,000 frames (over 7 minutes). Getting β down to 0.9 results in a mean length of complementary bursts of about 250 frames, which is not substantially larger than the mean burst of cropping >20% of nearly 25 frames. Thus it appears that there is a benefit in having a β≧1.0, so that there can be a long enough period of almost unimpaired video, so that it is considered to be of good quality.

The above described results show that the algorithm of the present invention is robust with respect systematic rate reductions in the allocated rate.

It can thus be seen from the above evaluation results that this smoothing algorithm can be very effective with various traces and in links with various numbers of sources. The multiplexing advantages achievable using the present invention will be described in the following separate section.

g. Multiplexing Experiments and Analysis

This section deals with experiments on the multiplexing properties of the aggregate demand. It is desirable to establish the bandwidth allocation which will be required per source, and how this depends on the number of sources allocated.

The required bandwidth will be determined by the quality target. The experiments reported above indicate that the second algorithm can tolerate a requested rate down to about ρ=0.9 times the allocated rate, even if this happens for on average $T_1$=300 frames out of every 350=$T_1$+Tρ for a wide variety of traces. With these criteria, it is deemed that a capacity K for serving an aggregate requested rate R(n) is adequate if:

The proportion K/R(n) of the aggregate requested rate which can be allocated is not less than ρ on average (over those frames for which K≦R(n)). That is, it is found that those frame instants during which R(n), the aggregate request rate is greater than the capacity, K of the network link. We look at the proportionate reduction, $\tau_{red}$=(R(n)−K)/(R(n)) at these instant. The capacity K is adequate if the mean value of $\tau_{red}$ is <(1−ρ).

The proportion of frames of the total that suffer a degradation because K≦R(n) is not more than $T_\rho/(T_1+T_\rho)$ and the mean number of consecutive such frames is no more than $T_\rho$.

The smallest value of K which satisfied these conditions then becomes a target for admission control mechanisms; i.e., a good control mechanism should be able to admit all flows in the aggregation to a capacity K without violating the quality targets.

Figure 26:
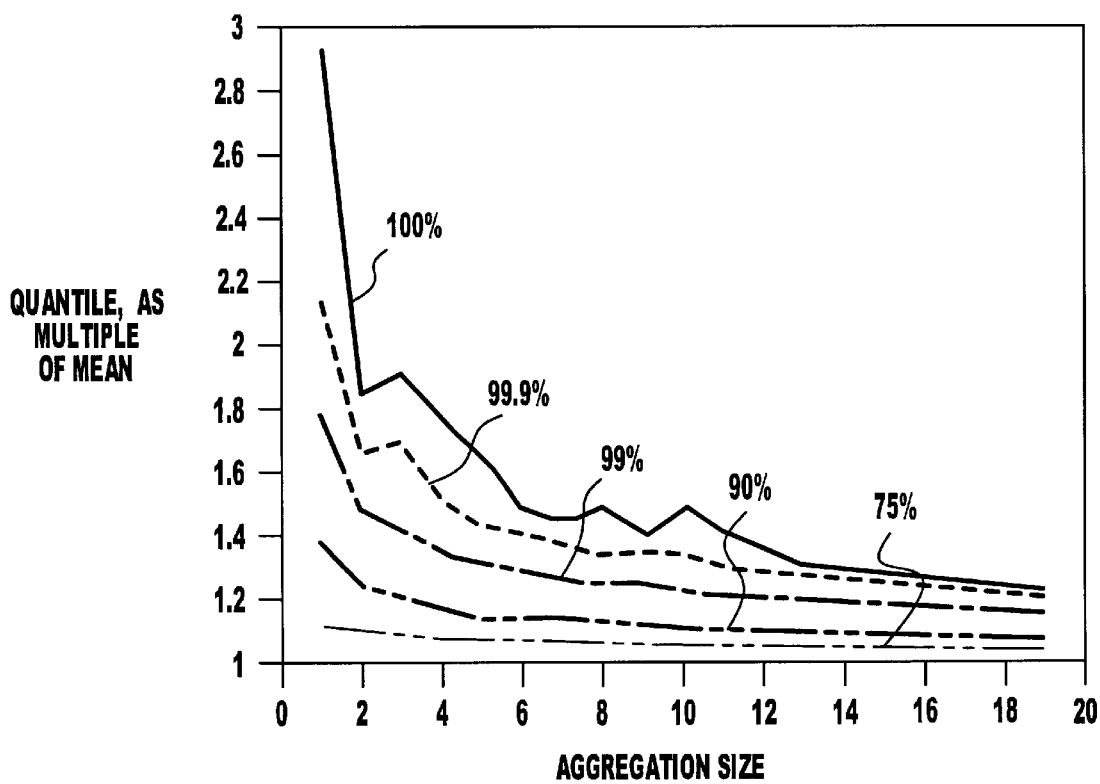
Figure 27:
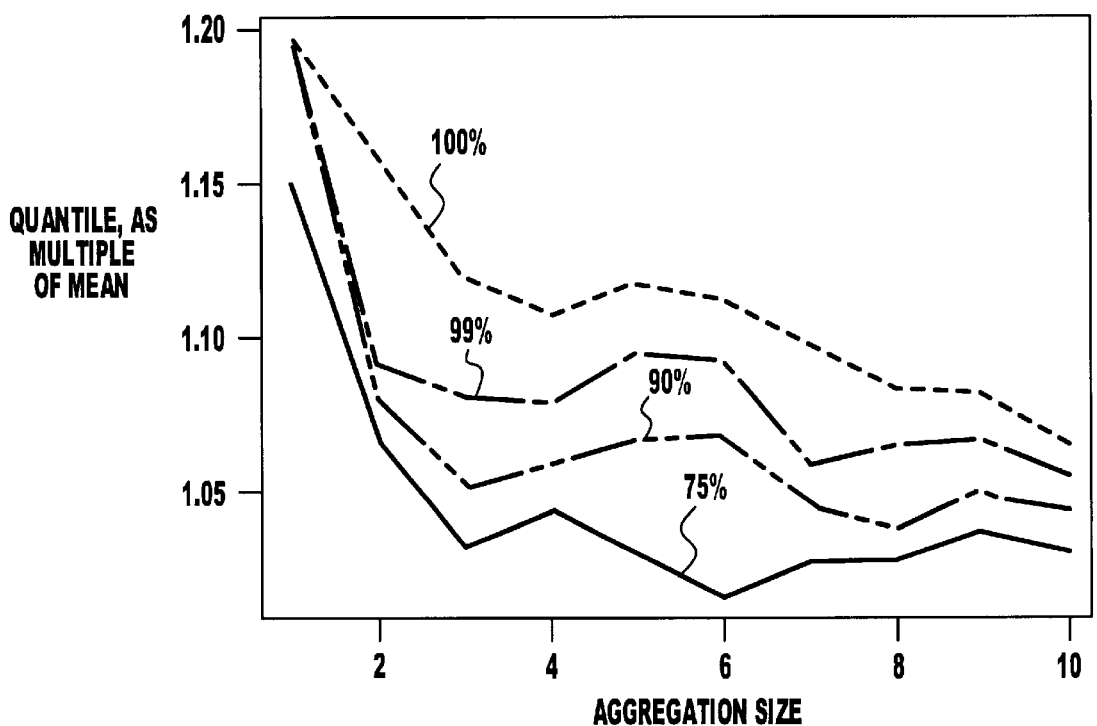

The aggregation properties of the 19 traces of set E, and 10 4000-frame segments of the single trace A (described in the table of FIG. 2) has been examined. An initial view of the aggregation properties is gained by showing quantities of the aggregate requested rate (as multiple of its mean) as a function of aggregation size: in FIG. 26 for set E and in FIG. 27 for set A. The requested rate for set A clearly has better properties under aggregation than set E, in that the quantile are smaller multiples of the mean for a given aggregation size. This is partly a reflection of the parameters used in the algorithm in each case: to obtain roughly equal quality per trace, $\omega_{max}$ was 1000 for set A, 12 for set E. Thus it would be expected that single flow requested rate to be smoother for set A, and hence that the aggregation properties would be better for set A.

The detailed performance of a larger aggregate, as the aggregation size is varied is investigated, using the aggregate of all traces (in each set independently), and setting the capacity K to a number of different high quantities of the aggregate rate. The analysis considered the statistics of excursions above this level: the mean length of runs of consecutive frame above and below K, maximum frame above, and the maximum and mean of the rate reduction, $r_{red}$=(1−K/R(n))(for frames for which R(n)≧K) which would be suffered by each constituent of the aggregate if rate allocation were done proportionately to rate requests when total requests exceed total capacity. The rate reduction criterion used is that the maximum value for the reduction, $r_{red}$ should be less than 1−ρ(0.1 in this case).

Figure 28:
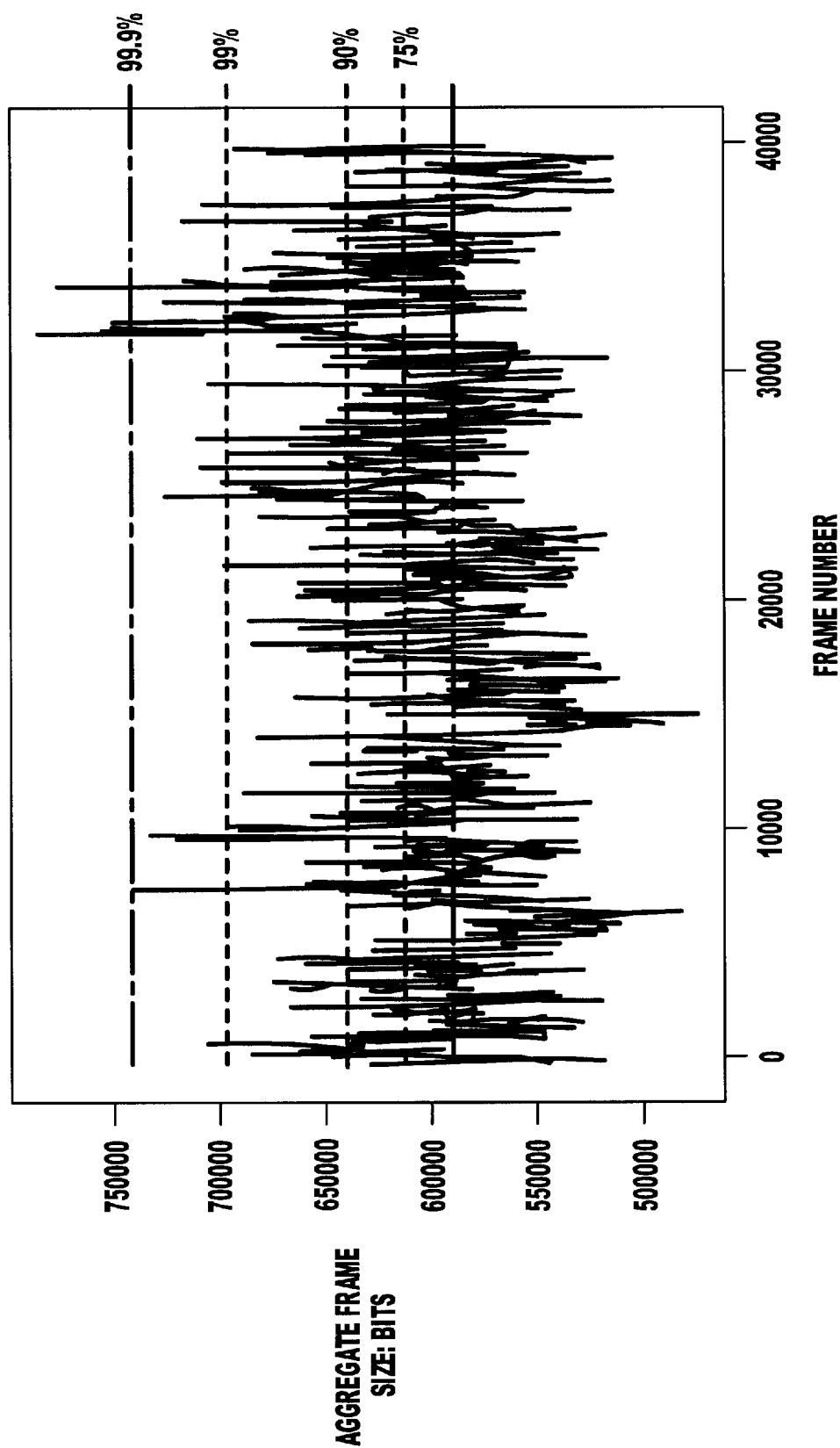

For trace set E, the time-series of the aggregate trace is shown in FIG. 28. Note that the vertical scale starts at 500,000 (i.e., about twice the vertical range shown). The analysis of rate reduction is summarized in the table of FIG. 29. Since the traces from this set have a 12-frame GOP, the analysis was done for two cases: with the I-frames aligned, and with random alignment. Whereas one would expect the performance on the randomly aligned case to be better due to smoothing across sources, one would not expect it to be much better, since the algorithm will typically request a rate determined by the largest frame size in the GOP. This is what was found: in both cases it seems that allocating a link capacity between 1.1 and 1.2 times the mean requested rate should be sufficient to fulfill the rate reduction criteria for this aggregate of 19 traces. This is based on the observation of the max reduction values (for frames which occur when $R(n) \geq K$) is around 10% in the table of FIG. 29. A number of random alignments of the I-frames were investigated; the conclusions from these are the same).

Figure 30:
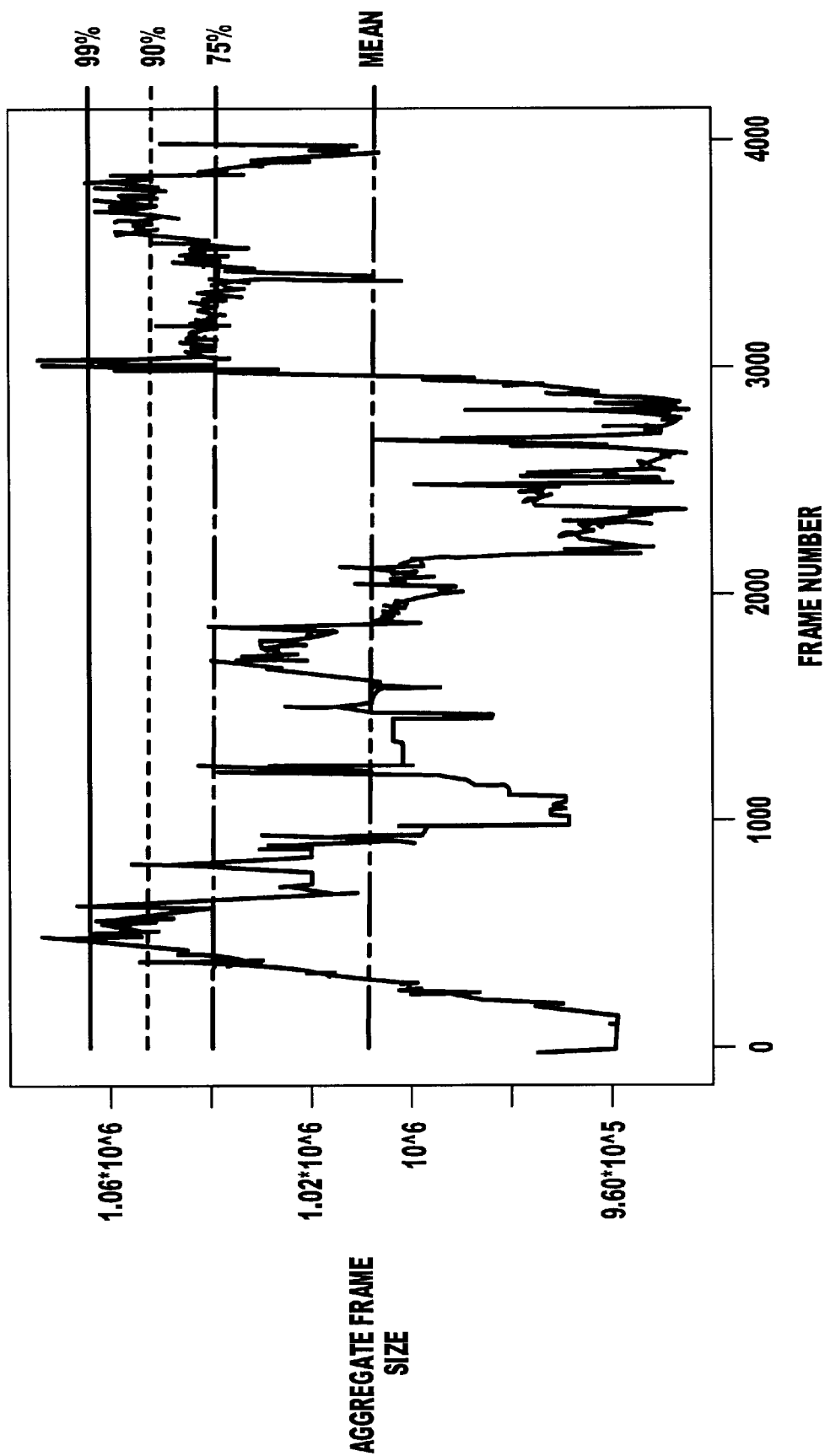

For trace set A, the bandwidth requirement was typically a smaller multiple of the mean aggregate demand, even though the aggregate was of about half as many (only 10) sources. The time series of the aggregate of the 10 4000-frame segments is shown in FIG. 30. Note that the vertical scale starts at 940000, i.e., about 10 times the vertical range displayed. The analysis of rate reduction is summarized in the table of FIG. 31. This shows that, for this aggregation of 10 trace segments, one need allocate capacity less than 10% over mean aggregate demand in order to achieve sufficiently small rate reduction (as seen by the max reduction value in the table of FIG. 31).

The effect of aggregation size on bandwidth requirements was investigated and it was observed that the 90% rate reduction from the network (allocated rate being 90% of the requested rate) is acceptable even for aggregation sizes as small as 5, with a capacity allocation of $K=1.2$ times mean aggregate request. Observing this, and the median of the ratio between the mean request rate to the mean ideal rate, one arrives at a rule of thumb: in order to guarantee sufficient quality per flow, the channel capacity should be about twice the sum, over all the flows, of the mean ideal rate. Of course, this is preliminary, possible applicable only to the set of traces we have examined.

D. Conclusion

The present invention employs one or more smoothing intervals to define a rate for transmission or a rate to be requested from an explicit rate network. The invention also provides that encoding rate changes are effectuated in relation to whether a delay introduced by a source buffer is determined to exceed a delay target. The result is a smoothing of the rate selections or requests and the data flow for otherwise bursty data. This smoothing facilitates multiplexing of bursty data over network links.

What is claimed is:

1. A method for improving a flow of video data from a source to a receiver, the method comprising the steps of:
    encoding video data at a first rate;
    storing the encoded video data in a buffer;
    requesting a rate allocation from a network, wherein a request amount is determined with reference to said first rate and to a frame rate over a smoothing interval;
    outputting data from the source buffer at a rate based on the network's response to the request for a rate allocation;
    monitoring a source delay with reference to buffer capacity, buffer fill status, an encoding rate and a rate allocated to the source in response to a request; and
    adjusting a rate for encoding said video data when said monitoring step detects that said source delay exceeds a first threshold.

2. The method of claim 1 further comprising the step of determining a maximum rate of encoding of said video data over an interval greater than the smoothing interval; and
    wherein said step of requesting a rate allocation includes the substep of referring to said determined maximum rate of encoding.

3. The method of claim 1 wherein said smoothing interval is greater than or equal to a frame periodicity of said encoded video data.

4. The method of claim 1 comprising the further step of determining an historical estimate of a local maximum rate of encoding of said video data; and
    wherein said step of requesting a allocation includes the substep of referring to said determined historical estimate.

5. The method of claim 1 wherein said step of requesting a rate comprises the substeps of:
    monitoring an ideal frame rate for the step of encoding;
    averaging the ideal frame rate over said smoothing interval; and
    using the result of said step of averaging as a basis for generating a rate allocation request.

6. The method of claim 5 wherein said step of requesting a rate includes the further substeps of:
    averaging peak frame rates over a second interval greater than said smoothing interval; and
    selecting said rate for the allocation request with reference to the result of averaging peak frame rates.

7. The method of claim 1 comprising the further step of increasing said smoothing interval when said source delay falls below a first predetermined value.

8. The method of claim 7 comprising the further step of decreasing said smoothing interval when said source delay exceeds a second predetermined value.

9. A method for improving a flow of video data from a source to a receiver, the method comprising the steps of:
    encoding video data;
    storing the coded data in a source buffer;
    monitoring a rate of the encoding of video data over a smoothing interval;
    determining a smoothed ideal encoding rate from the monitored rate; and
    generating a request for rate allocation with reference to the smoothed ideal rate.

10. The method of claim 9 further comprising the steps of:
    detecting a source delay with reference to an indication of the fullness of the buffer and a rate at which the source buffer drains; and modifying the smoothing interval in accordance with a size of said source delay.

11. The method of claim 9 further comprising the step of determining a maximum rate of encoding of said video data over an interval greater than the smoothing interval; and
    wherein said step of generating a request for rate allocation includes the substep of referring to said determined maximum rate of encoding.

12. The method of claim 11 wherein said smoothing interval is greater than or equal to a frame periodicity of said encoded video data.

13. The method of claim 9 wherein said smoothing interval is greater than or equal to a frame periodicity of said encoded video data.

14. The method of claim 9 comprising the further step of determining an historical estimate of a local maximum rate of encoding of said video data; and
    wherein said step of generating a request for allocation includes the substep of referring to said determined historical estimate.

15. The method of claim 11 comprising the further step of determining an historical estimate of a local maximum rate of encoding of said video data; and
    wherein said step of generating a request for allocation includes the substep of referring to said determined historical estimate.

16. The method of claim 9 comprising the further steps of:

outputting data from the source buffer at a rate based on a response to the request for rate allocation;

monitoring a source delay with reference to an indication of fullness of the buffer, the buffer output rate and the present rate at which data is encoded; and adjusting a rate for encoding the video data when said step of monitoring a source delay detects that said source delay exceeds a first threshold.

17. The method of claim 16 comprising the further step of modifying the smoothing interval in accordance with a size of said source delay.

18. A method for improving a flow of video data from a source to a receiver, the method comprising the steps of:

encoding video data;

monitoring an encoding rate over a first window interval, said first window interval being greater than or equal to a periodicity of the coded video data;

monitoring the encoding rate over a second window interval, greater than said first window interval; and requesting a rate allocation from a network in accordance with the results of said monitoring steps.

19. The method of claim 18 comprising the further steps of:

storing the encoded video data in a source buffer;

draining the source buffer in accordance with a rate allocated in response to the request for rate allocation;

detecting a source delay based on the content of the buffer, a rate of drain for the source buffer, and an encoding rate; and reducing the encoding rate when said source delay is greater than or equal to a target delay.

20. The method of claim 19 comprising the further step of increasing the encoding rate when said source delay is below a predetermined threshold.

21. A method for selecting a data rate allocation request with regard to a flow of video data from a source to a network, the method comprising the steps of:

monitoring a rate of encoding video data;

averaging the encoding rate over a smoothing interval equal to or greater than a periodicity the encoded video data; and calculating a rate allocation request using the result of the step of averaging.

22. The method of claim 21 including the further steps of:

calculating a source delay;

comparing the source delay to a first delay threshold; and adjusting a size of the smoothing interval based on a result of the step of comparing.

23. A method of improving a quality of a flow of video data from a source to a receiver via a network, the method comprising the steps of:

encoding the video data at a first rate;

storing encoded video data in a source buffer;

detecting a buffer drain rate;

determining a source delay with reference to an encoding rate, a buffer drain rate and a buffer fill level;

if said source delay exceeds a delay bound, setting an encoder target rate to reduce the source delay.

24. The method of claim 23 wherein said encoder target rate is set to reduce the source delay below said delay bound.

25. The method of claim 23 comprising the further steps of:

generating a rate allocation request to the network, said request being selected in accordance with an acceptable limit on encoder rate reduction.

26. A method for improving a flow of video data from a source to a receiver, the method comprising the steps of:

encoding video data;

storing the coded video data in a buffer;

monitoring a rate of encoding video data over a smoothing interval;

selecting a data transmission rate based on the encoding rate detected over the smoothing interval.

27. The method of claim 26 comprising the further steps of:

detecting a network acceptance rate with regard to data transmissions from the source; and adjusting said data transmission rate in accordance with the detected network acceptance rate.

28. The method of claim 27 comprising the further steps of:

detecting a source delay using the data transmission rate; and if said source delay exceeds a delay target, adjusting the rate of encoding of the video data.

\* \* \* \* \*